US012498464B2

(12) United States Patent
Mahara

(10) Patent No.: US 12,498,464 B2
(45) Date of Patent: Dec. 16, 2025

(54) LIGHT RECEPTION DEVICE AND DISTANCE MEASUREMENT DEVICE

(71) Applicant: SONY SEMICONDUCTOR SOLUTIONS CORPORATION, Kanagawa (JP)

(72) Inventor: Kumiko Mahara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1160 days.

(21) Appl. No.: 17/310,078

(22) PCT Filed: Jan. 17, 2020

(86) PCT No.: PCT/JP2020/001540
§ 371 (c)(1),
(2) Date: Jul. 15, 2021

(87) PCT Pub. No.: WO2020/153261
PCT Pub. Date: Jul. 30, 2020

(65) Prior Publication Data
US 2022/0050178 A1    Feb. 17, 2022

(30) Foreign Application Priority Data
Jan. 24, 2019    (JP) .................................. 2019-010671

(51) Int. Cl.
*G01S 7/00* (2006.01)
*G01S 7/486* (2020.01)
*G01S 17/08* (2006.01)
*H04N 25/78* (2023.01)

(52) U.S. Cl.
CPC .............. *G01S 7/486* (2013.01); *G01S 17/08* (2013.01); *H04N 25/78* (2023.01)

(58) Field of Classification Search
USPC ........................................................ 356/5.01
See application file for complete search history.

(56) References Cited

U.S. PATENT DOCUMENTS 9,564,897 B1    2/2017  Berzins et al.
10,645,323 B2*  5/2020  Takahashi ............ H04N 25/443
10,873,715 B2* 12/2020  Hanzawa ............. H04N 25/779
(Continued)

FOREIGN PATENT DOCUMENTS

CN    101667391 A    3/2010
CN    102984457 A    3/2013
(Continued)

OTHER PUBLICATIONS

International Search Report and Written Opinion of PCT Application No. PCT/JP2020/001540, issued on Feb. 18, 2020, 09 pages of ISRWO.

*Primary Examiner* — James R Hulka
(74) *Attorney, Agent, or Firm* — CHIP LAW GROUP

(57) ABSTRACT

A light reception device according to an embodiment includes: a light receiving unit including a plurality of light receiving elements arranged in a matrix array; and a plurality of read lines that transmits each of signals read from the plurality of light receiving elements. In the light reception device, each of the plurality of read lines is connected to two or more light receiving elements among the plurality of light receiving elements.

12 Claims, 22 Drawing Sheets

(56) References Cited

U.S. PATENT DOCUMENTS

| | | |
|---|---|---|
| 10,942,261 B2 * | 3/2021 | Wang .................. H03K 3/0372 |
| 11,543,496 B2 * | 1/2023 | Wang ............... H03K 3/356052 |
| 11,635,497 B2 * | 4/2023 | Kubota ................. G01S 7/4863 |
| | | 250/214.1 |
| 2014/0125855 A1 | 5/2014 | Maeda et al. |
| 2016/0133668 A1 | 5/2016 | Rothberg |
| 2017/0097417 A1 | 4/2017 | Wang |
| 2018/0077374 A1 | 3/2018 | Tomohiro |
| 2018/0081040 A1 * | 3/2018 | Kubota ................ G01S 7/4863 |
| 2019/0011562 A1 | 1/2019 | Pacala |
| 2019/0011567 A1 | 1/2019 | Pacala |
| 2020/0036930 A1 * | 1/2020 | Hanzawa ............... H04N 25/46 |
| 2020/0057148 A1 * | 2/2020 | Wang ................... H03K 3/0372 |
| 2020/0081097 A1 | 3/2020 | Abe |
| 2022/0075028 A1 * | 3/2022 | Mahara ................. G01S 17/931 |

FOREIGN PATENT DOCUMENTS

| | | |
|---|---|---|
| CN | 106560999 A | 4/2017 |
| CN | 107431774 A | 12/2017 |
| JP | 2007-142738 A | 6/2007 |
| JP | 2010-091377 A | 4/2010 |
| JP | 2016-184843 A | 10/2016 |
| JP | 2018-044923 A | 3/2018 |
| KR | 10-2017-0054221 A | 5/2017 |
| TW | I525307 B | 3/2016 |
| TW | 201629444 A | 8/2016 |
| WO | 2016/152635 A1 | 9/2016 |
| WO | WO-2019012789 A1 | 1/2019 |

* cited by examiner

LIGHT RECEPTION DEVICE AND DISTANCE MEASUREMENT DEVICE

CROSS REFERENCE TO RELATED APPLICATIONS

This application is a U.S. National Phase of International Patent Application No. PCT/JP2020/001540 filed on Jan. 17, 2020, which claims priority benefit of Japanese Patent Application No. JP 2019-010671 filed in the Japan Patent Office on Jan. 24, 2019. Each of the above-referenced applications is hereby incorporated herein by reference in its entirety.

FIELD

The present invention relates to a light reception device and a distance measurement device.

BACKGROUND

As one of distance measurement methods for measuring a distance to a measured object using light, a distance measurement method called a direct time of flight (ToF) method is known. In a distance measurement process according to the direct ToF method, reflection light generated as light emitted from a light source is reflected by the measured object is received by a light receiving element, and the distance to the target is measured based on a time between the emission of light and the reception as the reflection light. In addition, a configuration in which distance measurement is performed using a pixel array in which light receiving elements are arrayed in a two-dimensional lattice is known in the direct ToF method.

As one of distance measurement methods according to the direct ToF method, there is a method of scanning a target linearly in the horizontal direction (or vertical direction) with light emitted from a light source and detecting the reflection light thereof using the above-described pixel array.

CITATION LIST

Patent Literature

Patent Literature 1: JP 2018-044923 A

SUMMARY

Technical Problem

When the distance measurement is performed by linearly scanning the light from the light source and receiving the reflection light using the pixel array according to the direct ToF method, there is a case where a scan trajectory of light emitted from the light source is not linear, and the reflection light generated as the light is reflected from a target has distortion or deviation. Therefore, it is necessary to widen a light reception range in which simultaneous reading is possible in the pixel array in consideration of these distortion and deviation in order to perform the distance measurement with higher accuracy, which causes an increase in the number of wirings.

Solution to Problem

An object of the present disclosure is to provide a light reception device and a distance measurement device that enables highly accurate distance measurement with a smaller number of wires.

For solving the problem described above, a light reception device according to one aspect of the present disclosure has a light receiving unit including a plurality of light receiving elements arranged in a matrix array; and a plurality of read lines that transmits each of signals read from the plurality of light receiving elements, wherein the each of plurality of read lines is connected to two or more light receiving elements among the plurality of light receiving elements.

DESCRIPTION OF EMBODIMENTS

Hereinafter, each embodiment of the present disclosure will be described in detail with reference to the drawings. Note that the same portions are denoted by the same reference signs in the following respective embodiments, and a repetitive description thereof will be omitted.

Technology Applicable to Each Embodiment

The present disclosure relates to a technology of performing distance measurement using light. Prior to the description of each of the embodiments of the present disclosure, a technology applicable to each of the embodiments will be described for ease of understanding. In each of the embodiments, a direct time of flight (ToF) method is applied as a distance measurement method in this case. The direct ToF method is a method of receiving reflection light, generated as light emitted from a light source is reflected by a measured object, by a light receiving element, and performing distance measurement based on a time difference between a light emission timing and a light reception timing.

Figure 1:
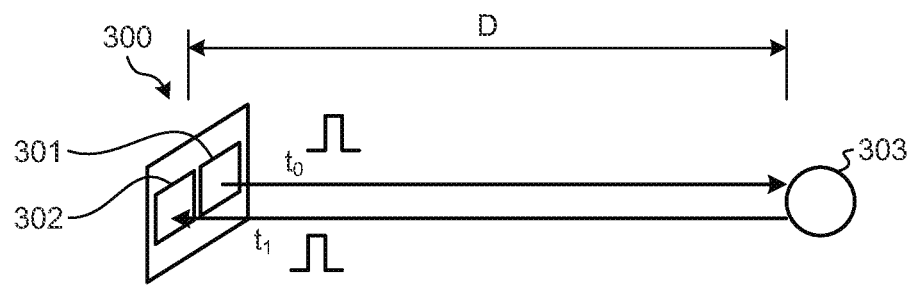
FIG. 1 is a view schematically illustrating distance measurement using a direct ToF method applicable to an embodiment.

The distance measurement using the direct ToF method will be schematically described with reference to FIGS. 1 and 2. FIG. 1 is a diagram schematically illustrating the distance measurement using the direct ToF method applicable to each of the embodiments. The distance measurement device 300 includes a light source unit 301 and a light receiving unit 302. The light source unit 301 is, for example, a laser diode, and is driven so as to emit laser light in a pulsed manner. Light emitted from the light source unit 301 is reflected by a measured object 303 and is received by the light receiving unit 302 as reflection light. The light receiving unit 302 includes a light receiving element that converts light into an electrical signal by photoelectric conversion, and outputs a signal in response to the received light.

Here, the time when the light source unit 301 emits light (light emission timing) is time $t_0$, and the time (light reception timing) at which the light receiving unit 302 receives the reflection light, generated as the light emitted from the light source unit 301 is reflected by the measured object 303, is time $t_1$. Assuming that a constant c is a speed of light ($2.9979 \times 10^8$ [m/sec]), a distance D between the distance measurement device 300 and the measured object 303 is calculated by the following Formula (1).

$$D = (c/2) \times (t_1 - t_0) \quad (1)$$

The distance measurement device 300 repeats the above-described processing a plurality of times. The light receiving unit 302 may include a plurality of light receiving elements, and the distance D may be calculated based on each light reception timing when reflection light is received by each of the light receiving elements. The distance measurement device 300 classifies time $t_m$ (called light reception time $t_m$) from time $t_0$ of the light emission timing to the light reception timing when the light is received by the light receiving unit 302 based on glasses (bins) to generate a histogram.

Note that the light received by the light receiving unit 302 during the light reception time $t_m$ is not limited to the reflection light generated as the light emitted by the light source unit 301 is reflected by the measured object. For example, ambient light around the distance measurement device 300 (light receiving unit 302) is also received by the light receiving unit 302.

Figure 2:
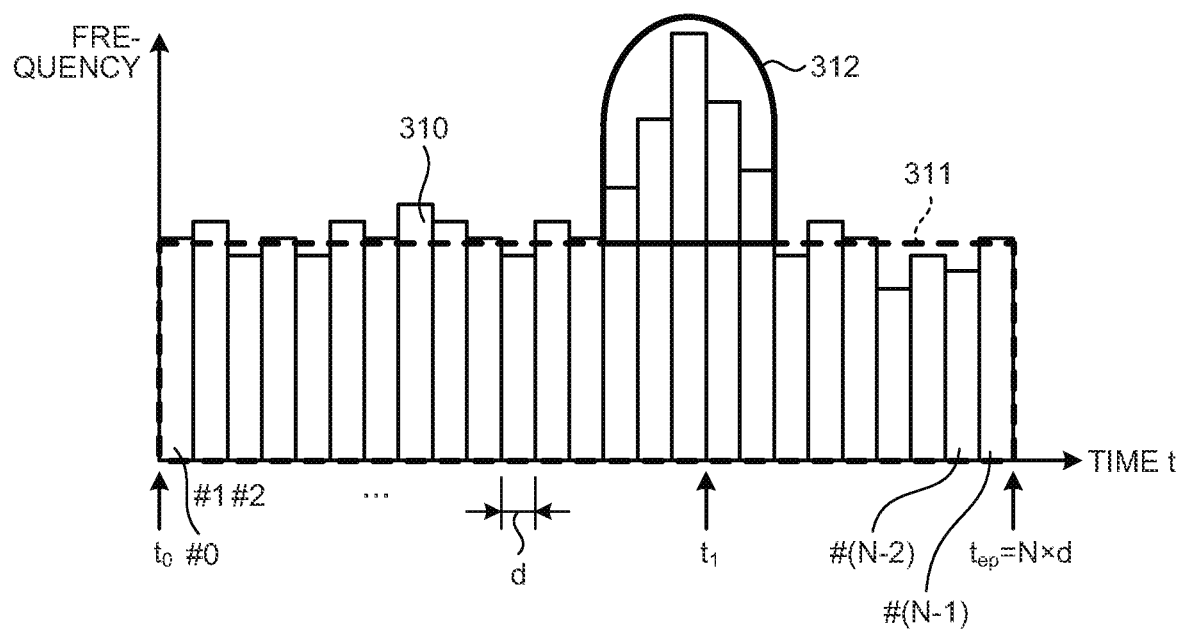
FIG. 2 is a graph illustrating a histogram of an example based on the time when light is received, which is applicable to the embodiment.

FIG. 2 is a graph illustrating a histogram of an example based on the time when the light receiving unit 302 receives light, which is applicable to each of the embodiments. In FIG. 2, the horizontal axis represents a bin and the vertical axis represents a frequency for each bin. The bin is a classification of the light reception time $t_m$ for each predetermined unit time d. Specifically, bin #0 is $0 \le t_m < d$, bin #1 is $d \le t_m < 2 \times d$, bin #2 is $2 \times d \le t_m < 3 \times d$, ..., and bin #(N−2) is $(N-2) \times d \le t_m < (N-1) \times d$. When an exposure time of the light receiving unit 302 is time $t_{ep}$, $t_{ep} = N \times d$.

The distance measurement device 300 counts the number of times the light reception time $t_m$ is acquired based on bins to obtain a frequency 310 for each of the bins to generate a histogram. Here, the light receiving unit 302 also receives light other than the reflection light generated as the light emitted from the light source unit 301 is reflected. An example of such light other than the target reflection light is the above-described ambient light. A portion indicated by a range 311 in the histogram includes an ambient light component of the ambient light. The ambient light is light that is randomly incident on the light receiving unit 302 and becomes noise with respect to the target reflection light.

Meanwhile, the target reflection light is light received according to a specific distance and appears as an active light component 312 in the histogram. A bin corresponding to a frequency of a peak in the active light component 312 is a bin corresponding to the distance D of the measured object 303. The distance measurement device 300 can calculate the distance D to the measured object 303 according to the above Formula (1) by acquiring representative time of the bin (for example, time at the center of the bin) as the above-described time $t_1$. In this manner, it is possible to execute appropriate distance measurement for random noise.

Figure 3:
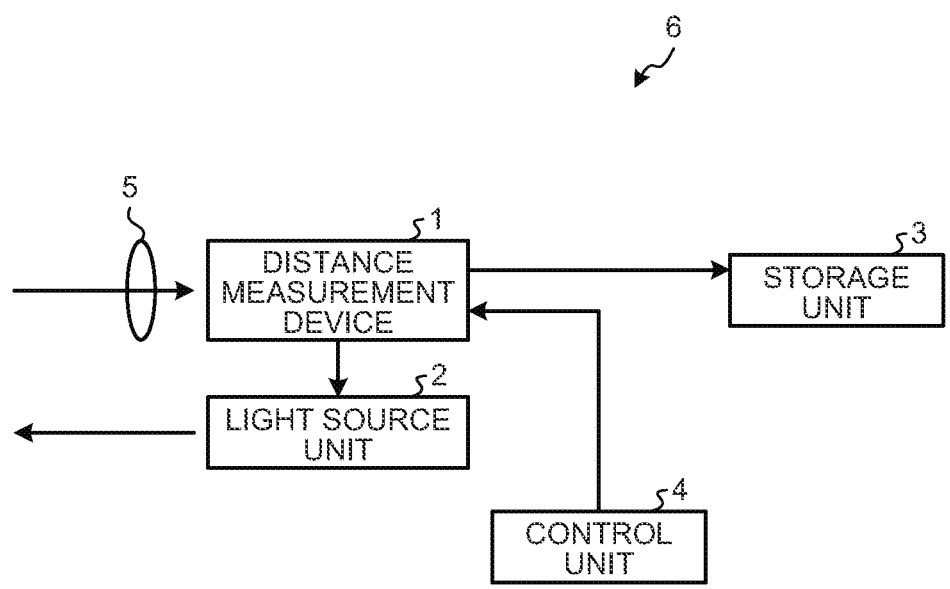
FIG. 3 is a block diagram illustrating a configuration of an example of an electronic device including a distance measurement device according to the embodiment.

FIG. 3 is a block diagram illustrating a configuration of an example of an electronic device including the distance measurement device according to each of the embodiments. In FIG. 3, an electronic device 6 includes a distance measurement device 1, a light source unit 2, a storage unit 3, a control unit 4, and an optical system 5.

The light source unit 2 corresponds to the above-described light source unit 301, and is a laser diode, and is driven so as to emit laser light in a pulsed manner, for example. A vertical cavity surface emitting laser (VCSEL) that emits laser light as a surface light source can be applied to the light source unit 2. A configuration in which an array in which laser diodes are arrayed on a line is used as the light source unit 2 and laser light emitted from the laser diode array is scanned in a direction perpendicular to the line may be applied without being limited thereto. Furthermore, it is also possible to apply a configuration in which a laser diode as a single light source is used and laser light emitted from the laser diode is scanned in horizontal and vertical directions.

The distance measurement device 1 includes a plurality of light receiving elements corresponding to the above-described light receiving unit 302. The plurality of light receiving elements are arrayed in a two-dimensional lattice (matrix), for example, to form a light reception surface. The optical system 5 guides light incident from the outside to the light reception surface included in the distance measurement device 1.

The control unit 4 controls the overall operation of the electronic device 6. For example, the control unit 4 supplies the distance measurement device 1 with a light emission trigger which is a trigger for causing the light source unit 2 to emit light. The distance measurement device 1 causes the light source unit 2 to emit light at a timing based on this light emission trigger, and stores time to indicating the light emission timing. In addition, the control unit 4 sets a pattern for distance measurement for the distance measurement device 1 in response to an instruction from the outside, for example.

The distance measurement device 1 counts the number of times of acquisition of time information (light reception time $t_m$) indicating the timing at which light is received on the light reception surface within a predetermined time range, and obtains a frequency for each bin to generate the above-described histogram. The distance measurement device 1 further calculates the distance D to the measured object based on the generated histogram. Information indicating the calculated distance D is stored in the storage unit 3.

Figure 4:
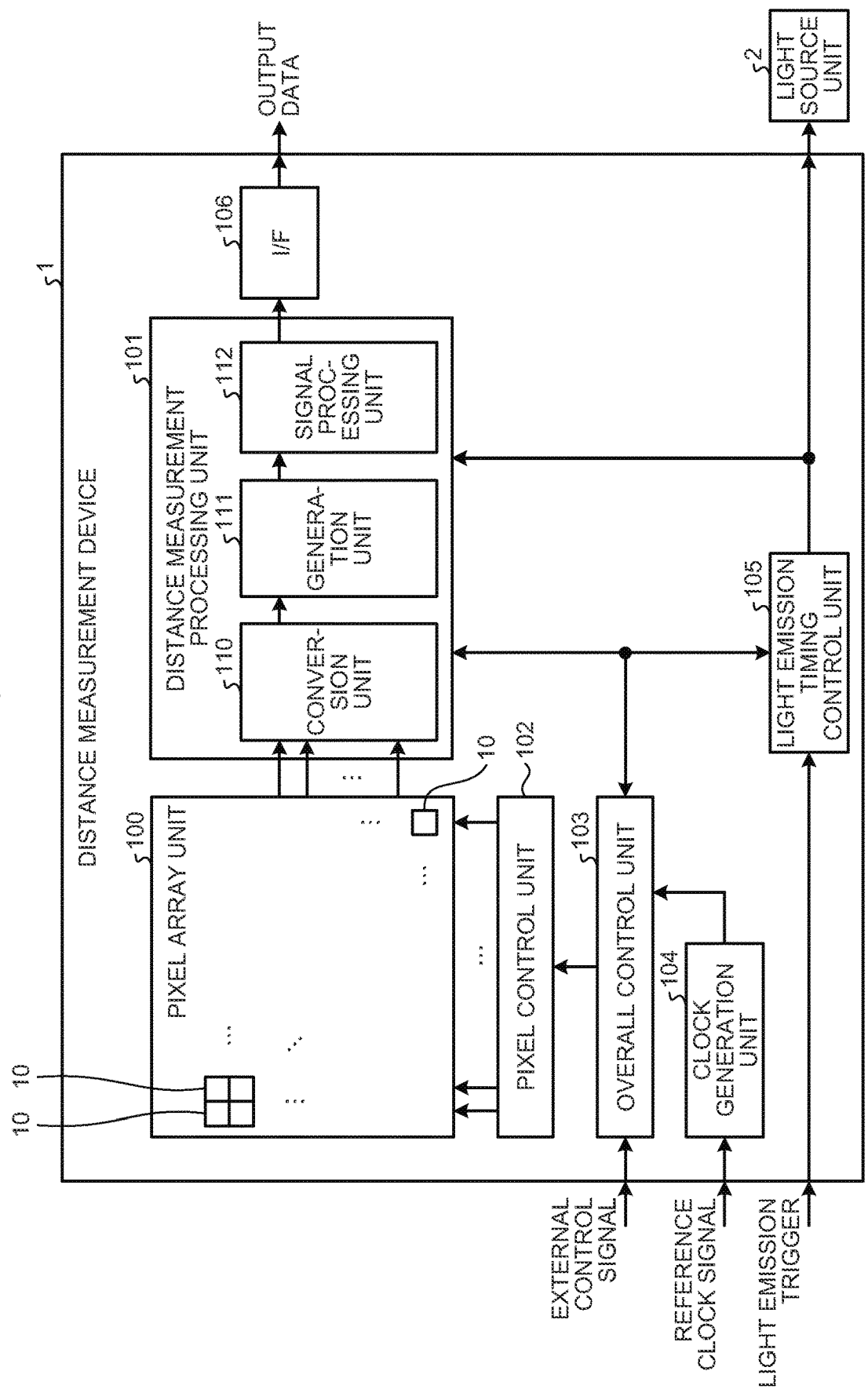
FIG. 4 is a block diagram illustrating a more detailed configuration of an example of the distance measurement device applicable to the embodiment.

FIG. 4 is a block diagram illustrating a more detailed configuration of an example of the distance measurement device 1 applicable to each of the embodiments. In FIG. 4, the distance measurement device 1 includes a pixel array unit 100, a distance measurement processing unit 101, and a pixel control unit 102, an overall control unit 103, a clock generation unit 104, a light emission timing control unit 105, and an interface (I/F) 106. These pixel array unit 100, distance measurement processing unit 101, pixel control unit 102, overall control unit 103, clock generation unit 104, light emission timing control unit 105, and interface (I/F) 106 are arranged on, for example, one semiconductor chip.

In FIG. 4, the overall control unit 103 controls an overall operation of the distance measurement device 1 according to, for example, a program incorporated in advance. In addition, the overall control unit 103 can also execute control according to an external control signal supplied from the outside. The clock generation unit 104 generates one or more clock signals used in the distance measurement device 1 based on a reference clock signal supplied from the outside. The light emission timing control unit 105 generates a light emission control signal indicating a light emission timing according to a light emission trigger signal supplied from the outside. The light emission control signal is supplied to the light source unit 2 and also supplied to the distance measurement processing unit 101.

The pixel array unit 100 includes a plurality of pixel circuits 10, 10, and so on which are arrayed in a two-dimensional lattice and include the light receiving elements, respectively. An operation of each of the pixel circuits 10 is controlled by the pixel control unit 102 according to an instruction of the overall control unit 103. For example, the pixel control unit 102 can control reading of a pixel signal from each of the pixel circuits 10 for each block including (p×q) pixel circuits 10 with p pixels in the row direction and q pixels in the column direction. In addition, the pixel control unit 102 can scan each of the pixel circuits 10 in the row direction and further in the column direction in a unit of the block to read the pixel signal from each of the pixel circuits 10. The pixel control unit 102 can also control the respective pixel circuits 10 independently without being limited thereto. Further, the pixel control unit 102 can set a predetermined area of the pixel array unit 100 as a target area, and set the pixel circuit 10 included in the target area as the pixel circuit 10 as a read target of the pixel signal. Furthermore, the pixel control unit 102 can collectively scan a plurality of rows (plurality of lines) and further scan the plurality of rows in the column direction to read pixel signals from the respective pixel circuits 10.

The pixel signal read from each of the pixel circuits 10 is supplied to the distance measurement processing unit 101. The distance measurement processing unit 101 includes a conversion unit 110, a generation unit 111, and a signal processing unit 112.

The pixel signal read from each of the pixel circuits 10 and output from the pixel array unit 100 is supplied to the conversion unit 110. Here, the pixel signal is asynchronously read from each of the pixel circuits 10 and supplied to the conversion unit 110. That is, the pixel signal is read from a light receiving element and output according to a timing at which light is received in each of the pixel circuits 10.

The conversion unit 110 converts the pixel signal supplied from the pixel array unit 100 into digital information. That is, the pixel signal supplied from the pixel array unit 100 is output in response to the timing at which light is received by the light receiving element included in the pixel circuit 10 corresponding to the pixel signal. The conversion unit 110 converts the supplied pixel signal into time information indicating the timing.

The generation unit 111 generates a histogram based on the time information in which the pixel signal is converted by the conversion unit 110. Here, the generation unit 111 counts the time information based on the unit time d set by a setting unit 113 to generate the histogram. Details of histogram generation processing of the generation unit 111 will be described later.

The signal processing unit 112 performs predetermined arithmetic processing based on data of the histogram generated by the generation unit 111, and calculates, for example, distance information. The signal processing unit 112 creates, for example, a curve approximation of the histogram based on the data of the histogram generated by the generation unit 111. The signal processing unit 112 can detect a peak of the curve obtained by approximating this histogram and obtain the distance D based on the detected peak.

When performing the curve approximation of the histogram, the signal processing unit 112 can apply filter processing to the curve obtained by approximating the histogram. For example, the signal processing unit 112 can suppress a noise component by performing low-pass filter processing to the curve obtained by approximating the histogram.

The distance information obtained by the signal processing unit 112 is supplied to the interface 106. The interface 106 outputs the distance information supplied from the signal processing unit 112 to the outside as output data. As the interface 106, for example, a mobile industry processor interface (MIPI) can be applied.

Note that the distance information obtained by the signal processing unit 112 is output to the outside via the interface 106 in the above description, but the present invention is not limited to this example. That is, it may be configured such that histogram data, which is the data of the histogram generated by the generation unit 111, is output from the interface 106 to the outside. In this case, information indicating a filter coefficient can be omitted from distance measurement condition information set by the setting unit 113. The histogram data output from the interface 106 is supplied to, for example, an external information processing device, and is appropriately processed.

Figure 5:
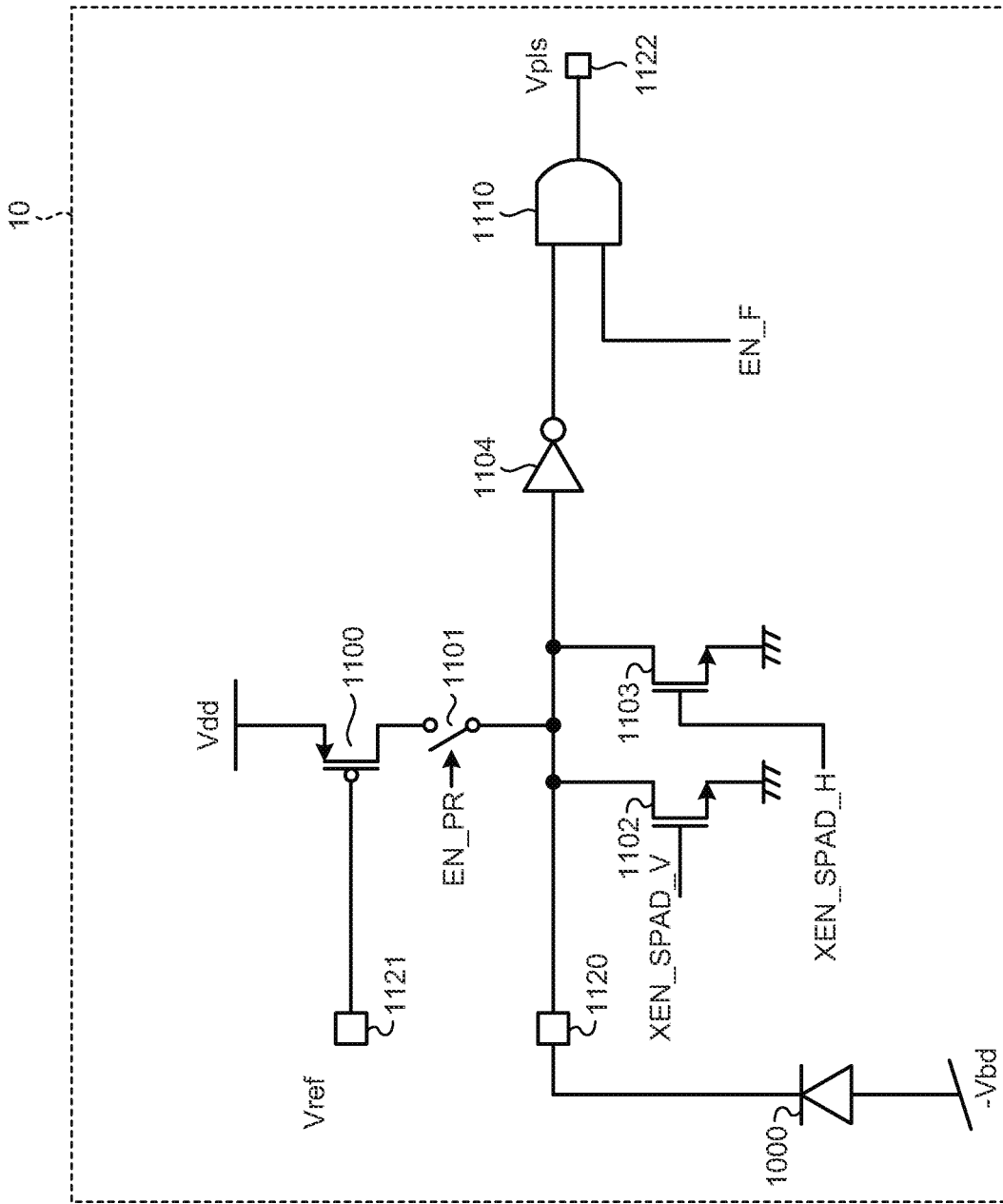
FIG. 5 is a diagram illustrating a basic configuration example of a pixel circuit applicable to the embodiment.

FIG. 5 is a diagram illustrating a basic configuration example of the pixel circuit 10 applicable to each of the embodiments. In FIG. 5, the pixel circuit 10 includes a light receiving element 1000, transistors 1100, 1102, and 1103, an inverter 1104, a switch unit 1101, and an AND circuit 1110.

The light receiving element 1000 converts incident light into an electrical signal by photoelectric conversion and outputs the electrical signal. In each of the embodiments, the light receiving element 1000 converts an incident photon (photon) into the electrical signal by photoelectric conversion, and outputs a pulse in response to the incidence of the photon. In each of the embodiments, a single photon avalanche diode is used as the light receiving element 1000. Hereinafter, the single photon avalanche diode is referred to as single photon avalanche diode (SPAD). The SPAD has a characteristic that a large current flows as an electron generated in response to the incidence of one photon causes avalanche multiplication if a large negative voltage is applied to a cathode that causes the avalanche multiplication. The incidence of one photon can be detected with high sensitivity by utilizing this characteristic of the SPAD.

In FIG. 5, the light receiving element 1000, which is the SPAD, has a cathode connected to a coupling portion 1120 and an anode connected to a voltage source of a voltage (−Vbd). The voltage (−Vbd) is a large negative voltage to generate avalanche multiplication for the SPAD. The coupling portion 1120 is connected to one end of the switch unit 1101 controlled to be on (closed) and off (open) according to a signal EN_PR. The other end of the switch unit 1101 is connected to a drain of the transistor 1100 which is a P-channel metal oxide semiconductor field effect transistor (MOSFET). A source of the transistor 1100 is connected to a power supply voltage Vdd. In addition, a coupling portion 1121 to which a reference voltage Vref is supplied is connected to a gate of the transistor 1100.

The transistor 1100 is a current source that outputs a current corresponding to the power supply voltage Vdd and the reference voltage Vref from the drain. With such a configuration, a reverse bias is applied to the light receiving element 1000. When a photon is incident on the light receiving element 1000 in the on state of the switch unit 1101, the avalanche multiplication is started, and a current flows from the cathode toward the anode of the light receiving element 1000.

A signal extracted from a connection point between the drain of the transistor 1100 (one end of the switch unit 1101) and the cathode of the light receiving element 1000 is input to the inverter 1104. The inverter 1104 determines, for example, a threshold for the input signal, inverts the signal each time the signal exceeds the threshold in the positive direction or the negative direction, and outputs the signal as a pulsed signal Vpls.

The signal Vpls output from the inverter 1104 is input to a first input end of the AND circuit 1110. The signal EN_F is input to a second input end of the AND circuit 1110. The AND circuit 1110 outputs the signal Vpls from the pixel circuit 10 via a terminal 1122 when both the signal Vpls and the signal EN_F are in a high state.

In FIG. 5, the coupling portion 1120 is further connected to drains of transistors 1102 and 1103 which are N-channel MOSFETs, respectively. Sources of the transistors 1102 and 1103 are connected, for example, to a ground potential. A signal XEN_SPAD_V is input to a gate of the transistor 1102. In addition, a signal XEN_SPAD_H is input to a gate of the transistor 1103. When at least one of these transistors 1102 and 1103 is in the off state, the cathode of the light receiving element 1000 is forcibly set to the ground potential, and the signal Vpls is fixed in a low state.

The signals XEN_SPAD_V and XEN_SPAD_H are used as vertical and horizontal control signals, respectively, in a two-dimensional lattice in which the respective pixel circuits 10 are arranged in the pixel array unit 100. As a result, the on state and the off state of each of the pixel circuits 10 included in the pixel array unit 100 can be controlled for each of the pixel circuits 10. Note that the on state of the pixel circuit 10 is a state where the signal Vpls can be output, and the off state of the pixel circuit 10 is a state where the output of the signal Vpls is not possible.

For example, in the pixel array unit 100, the signal XEN_SPAD_H is set to a state where the transistor 1103 is turned on for consecutive q columns of the two-dimensional lattice, and the signal XEN_SPAD_V is set to a state where the transistor 1102 is turned on for consecutive p rows. As a result, the output of each of the light receiving elements 1000 can be enabled in a block shape of p rows×q columns. In addition, the signal Vpls is output from the pixel circuit 10 as the logical product with the signal EN_F obtained by the AND circuit 1110, and thus, it is possible to control enable/disable in more detail for the output of each of the light receiving elements 1000 enabled by the signals XEN_SPAD_V and XEN_SPAD_H.

Further, when the signal EN_PR that turns off the switch unit 1101 is supplied to the pixel circuit 10 including the light receiving element 1000 whose output is disabled, for example, the supply of the power supply voltage Vdd to the light receiving element 1000 can be stopped, and the pixel circuit 10 can be turned off. As a result, it is possible to reduce the power consumption of the pixel array unit 100.

These signals XEN_SPAD_V, XEN_SPAD_H, EN_PR, and EN_F are generated by the overall control unit 103 based on parameters stored in a register or the like of the overall control unit 103, for example. The parameters may be stored in the register in advance, or may be stored in the register according to an external input. Each of the signals XEN_SPAD_V, XEN_SPAD_H, EN_PR, and EN_F generated by the overall control unit 103 is supplied to the pixel array unit 100 by the pixel control unit 102.

Note that the control according to the signals EN_PR, XEN_SPAD_V, and XEN_SPAD_H using the switch unit 1101 and the transistors 1102 and 1103 described above is control according to an analog voltage. On the other hand, the control according to the signal EN_F using the AND circuit 1110 is control according to a logic voltage. Therefore, the control according to the signal EN_F is possible at a lower voltage as compared with the control according to the signals EN_PR, XEN_SPAD_V, and XEN_SPAD_H, and is easy to handle.

Figure 6:
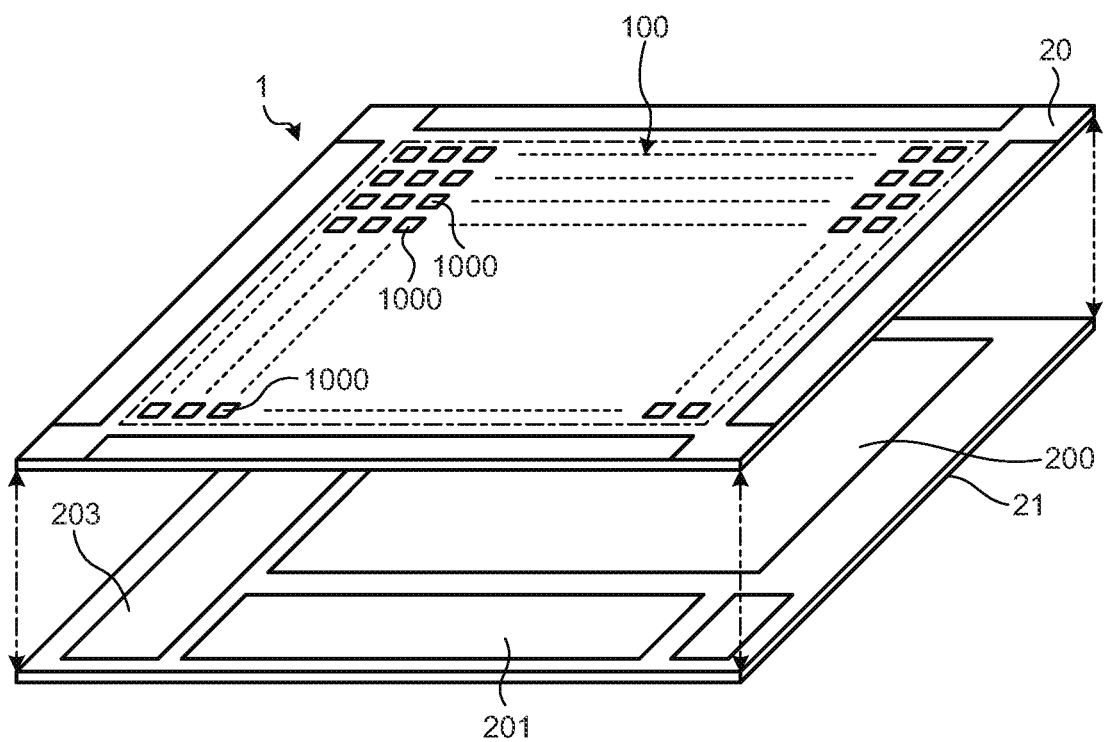
FIG. 6 is a schematic view illustrating an example of a device configuration applicable to the distance measurement device according to the embodiment.

FIG. 6 is a schematic view illustrating an example of a device configuration applicable to the distance measurement device 1 according to each of the embodiments. In FIG. 6, the distance measurement device 1 is configured by stacking a light receiving chip 20 and a logic chip 21 each of which is made of a semiconductor chip. Note that FIG. 5 illustrates the light receiving chip 20 and the logic chip 21 in a separated state for the sake of the description.

In the light receiving chip 20, the light receiving elements 1000 included in the plurality of pixel circuits 10, respectively, are arrayed in a two-dimensional lattice in a region of the pixel array unit 100. In addition, the transistors 1100, 1102, and 1103, the switch unit 1101, the inverter 1104, and the AND circuit 1110 are formed on the logic chip 21 in the pixel circuit 10. The cathode of the light receiving element 1000 is connected between the light receiving chip 20 and the logic chip 21 via, for example, the coupling portion 1120 by a copper-copper connection (CCC) or the like.

The logic chip 21 is provided with a logic array unit 200 including a signal processing unit that processes a signal acquired by the light receiving element 1000. A signal processing circuit unit 201 that processes a signal acquired by the light receiving element 1000 and an element control unit 203 that controls the operation as the distance measurement device 1 can be provided with respect to the logic chip 21 in close proximity to the logic array unit 200.

For example, the signal processing circuit unit 201 can include the above-described distance measurement processing unit 101. In addition, the element control unit 203 can include the above-described pixel control unit 102, overall control unit 103, clock generation unit 104, light emission timing control unit 105, and interface 106.

Note that the configuration on the light receiving chip 20 and the logic chip 21 is not limited to this example. In addition, the element control unit 203 can be arranged, for example, in the vicinity of the light receiving element 1000 for the other purpose of driving or control, in addition to the control of the logic array unit 200. The element control unit 203 can be provided so as to have an arbitrary function in an arbitrary region on the light receiving chip 20 and the logic chip 21 in addition to the arrangement illustrated in FIG. 6.

Figure 7:
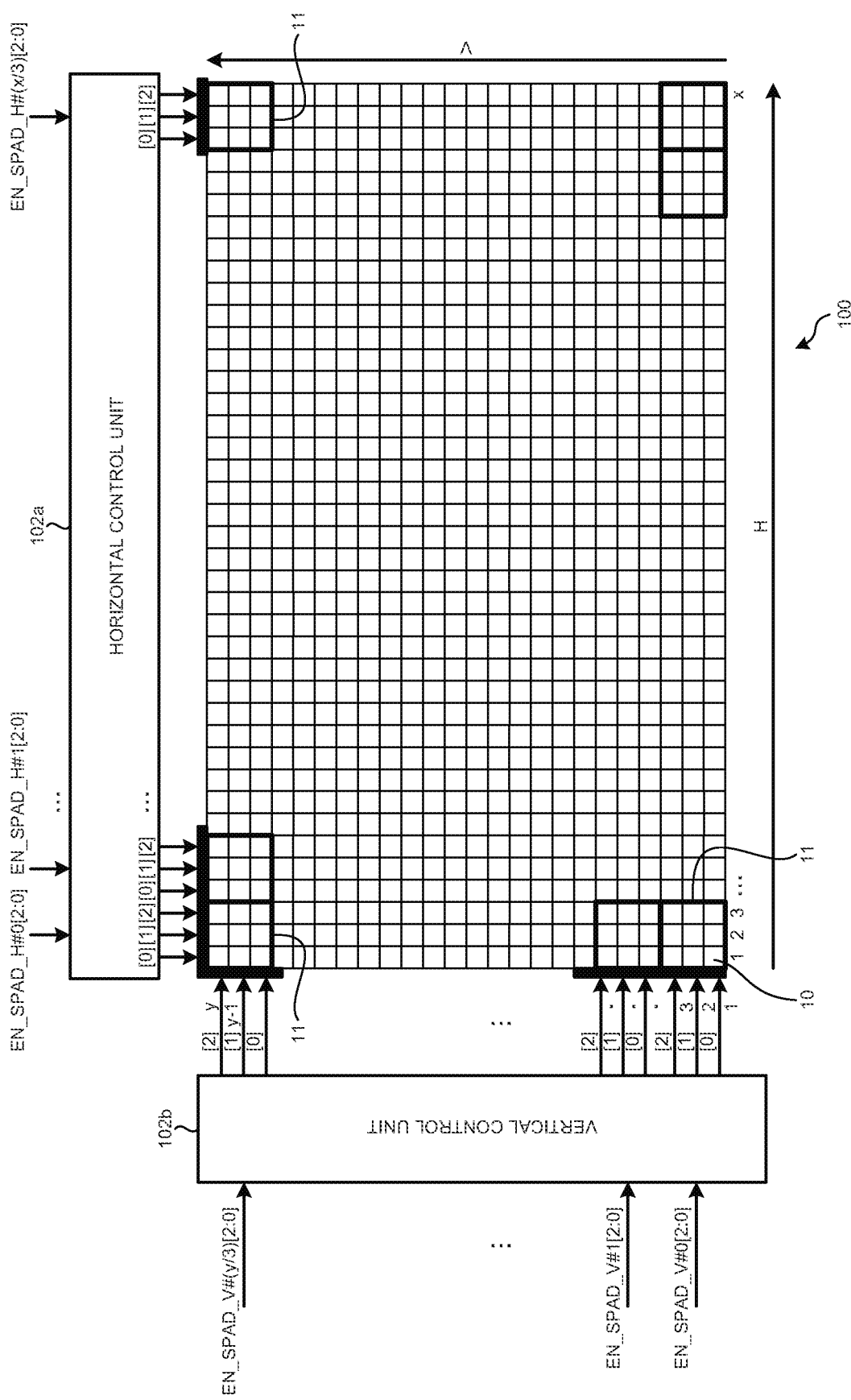
FIG. 7 is a view illustrating a more specific configuration example of a pixel array unit according to the embodiment.

FIG. 7 is a diagram illustrating a more specific configuration example of the pixel array unit 100 according to each of the embodiments. The pixel control unit 102 described with reference to FIG. 4 is illustrated to be separated into a horizontal control unit 102a and a vertical control unit 102b in FIG. 7.

In FIG. 7, the pixel array unit 100 includes a total of (x×y) pixel circuits 10 in x columns in the horizontal direction and y rows in the vertical direction. In addition, each of the pixel circuits 10 included in the pixel array unit 100 is controlled for each element 11 including a total of nine pixel circuits 10 including three in the horizontal direction and three in the vertical direction in each of the embodiments.

For example, a signal EN_SPAD_H corresponding to the above signal XEN_SPAD_H for controlling each of the pixel circuits 10 in the row direction (horizontal direction), that is, in units of columns is output from the overall control unit 103 by a 3-bit signal (indicated as [2:0]) with the element 11 as a unit, and is supplied to the horizontal control unit 102a. That is, signals EN_SPAD_H[0], EN_SPAD_H[1], and EN_SPAD_H[2] for the three pixel circuits 10 arranged consecutively in the horizontal direction are merged and transmitted by this one 3-bit signal.

In the example of FIG. 7, signals EN_SPAD_H#0[2:0], EN_SPAD_H#1[2:0], . . . , and EN_SPAD_H#(x/3) [2:0] are generated by the overall control unit 103 in order from the leftmost element 11 of the pixel array unit 100, and are supplied to the horizontal control unit 102a. The horizontal control unit 102a controls each column of the corresponding element 11 according to 3-bit values (indicated as [0], [1], and [2]) of the respective signals EN_SPAD_H#0[2:0], EN_SPAD_H#1[2:0], . . . , and EN_SPAD_H#(x/3) [2:0].

Similarly, for example, a signal EN_SPAD_V corresponding to the above-described signal XEN_SPAD_V for controlling each of the pixel circuits 10 in the column direction (vertical direction), that is, in units of rows is output from the overall control unit 103 by a 3-bit signal with the element 11 as a unit, and is supplied to the vertical control unit 102b. That is, signals EN_SPAD_V[0], EN_SPAD_V[1], and EN_SPAD_V[2] for the three pixel circuits 10 arranged consecutively in the vertical direction are merged and transmitted by this one 3-bit signal.

In the example of FIG. 7, signals EN_SPAD_V#0[2:0], EN_SPAD_V#1[2:0], . . . , and EN_SPAD_V#(y/3)[2:0] are generated by the overall control unit 103 in order from the lowermost element 11 of the pixel array unit 100, and are supplied to the vertical control unit 102b. The vertical control unit 102b controls each row of the corresponding element 11 according to 3-bit values of the respective signals EN_SPAD_V#0[2:0], EN_SPAD_V#1[2:0], . . . , and EN_SPAD_V#(y/3)[2:0].

Note that the signal EN_PR is output from the overall control unit 103 as a 3-bit signal with the element 11 as a unit and supplied to the vertical control unit 102b, for example, similarly to the above-described signal EN_SPAD_V although not illustrated. The vertical control unit 102b controls each row of the corresponding element according to the 3-bit value of each of the signals EN_PR.

Figure 8A:
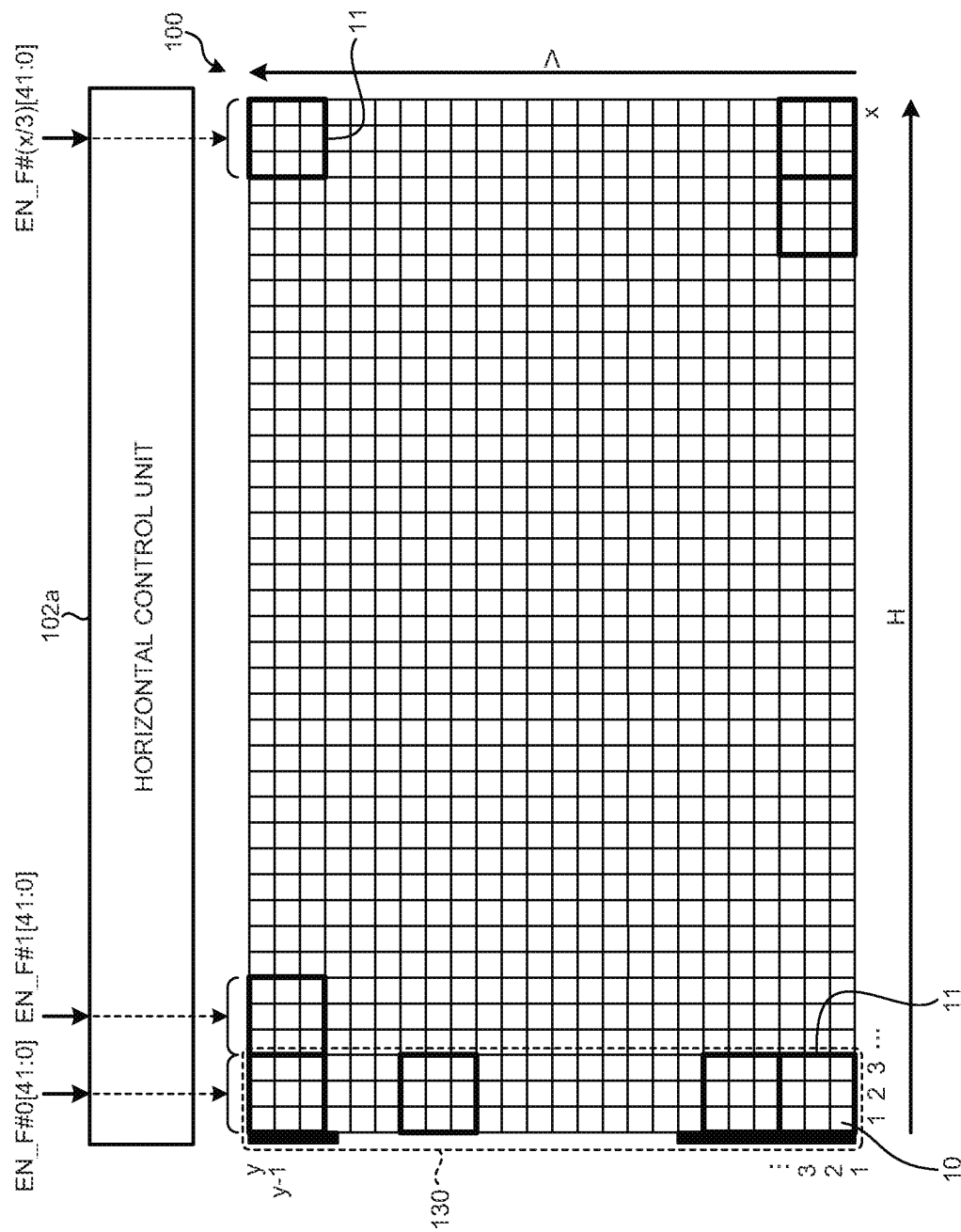
FIG. 8A is a view illustrating an example of a detailed configuration of the pixel array unit according to the embodiment.
Figure 8B:
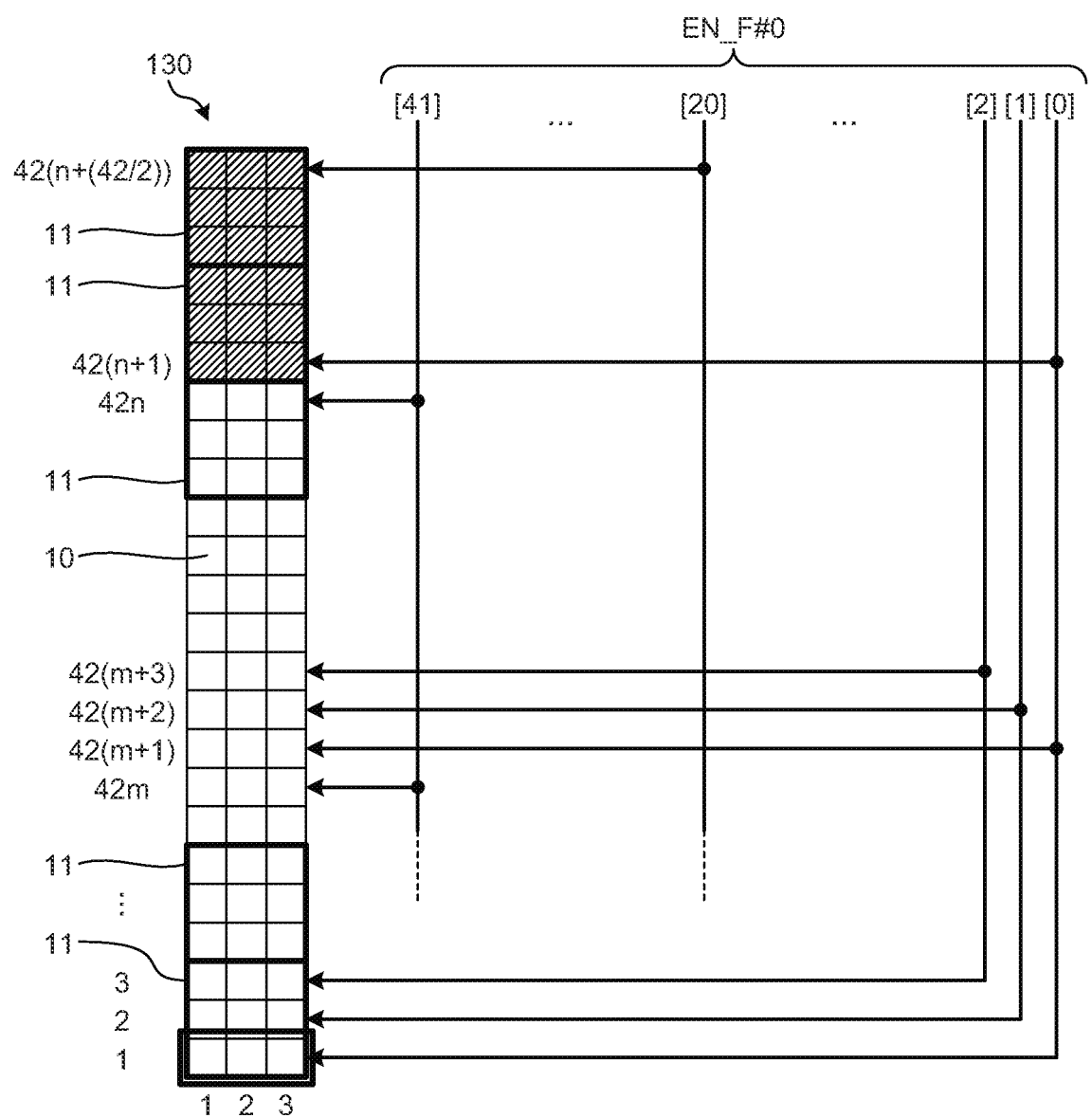
FIG. 8B is a view illustrating an example of a detailed configuration of the pixel array unit according to the embodiment.

FIGS. 8A and 8B are views illustrating examples of a detailed configuration of the pixel array unit 100 according to each of the embodiments. More specifically, FIGS. 8A and 8B illustrate the control according to the signal EN_F.

As illustrated in FIG. 8A, the signal EN_F is a signal supplied for each control target 130 including a plurality of adjacent columns of the pixel array unit 100. Here, the control target 130 is illustrated as one including three columns in accordance with a size of the element 11. In addition, as the signal EN_F, the same signal is supplied to each row included in the control target 130 for each row having a predetermined cycle. That is, the same signal EN_F is supplied to the three pixel circuits 10 in the same row in this example in which the control target 130 includes three columns. In FIG. 8A, as an example, the signal EN_F is a 42-bit (illustrated as [41:0]) signal, and the same signal is supplied every 42 rows (7 rows×6). In the example of FIG. 8A, signals EN_F#0[41:0], EN_F#1[41:0], . . . , and EN_F#(x/3)[41:0] are output from the overall control unit 103 for every three columns from the left end of the pixel array unit 100, and supplied to the horizontal control unit 102a.

The horizontal control unit 102a supplies each bit of each of the signals EN_F#0[41:0], EN_F#1[41:0], . . . , and EN_F#(x/3)[41:0] to each corresponding row of the control target 130. As illustrated in FIG. 8B, the horizontal control unit 102a supplies the signal EN_F#0[0], for example, to the leftmost control target 130 of the pixel array unit 100 every 42 rows, that is, the first row, the 42(m+1)th row (m is an integer of one or more), . . . , the 42(n+1)th row, . . . , and so on. Similarly, the horizontal control unit 102a supplies the signal EN_F#0[2] every 42 rows, that is, the second row, the 42(m+2)th row, and so on. Note that the uppermost row of the control target 130 is the first half of the unit of 42 rows, and is supplied with the signal EN_F#0[20] in FIG. 8B.

That is, with this 42-bit signal EN_F[41:0], the signals EN_F[0], EN_F[1], . . . , and EN_F[41] for 42 groups obtained by arranging a group each including three pixel circuits 10, arranged consecutively in the horizontal direction, consecutively in the vertical direction are merged and transmitted.

In this manner, the pixel array unit 100 can be controlled differently for each of the plurality of columns by the signal EN_F. Further, the pixel array unit 100 is supplied with the same signal EN_F every a plurality of rows in the plurality of columns. Therefore, it is possible to control each of the pixel circuits 10 included in the pixel array unit 100 with the plurality of columns as the minimum unit in the width direction and the plurality of rows as a cycle.

Figure 9:
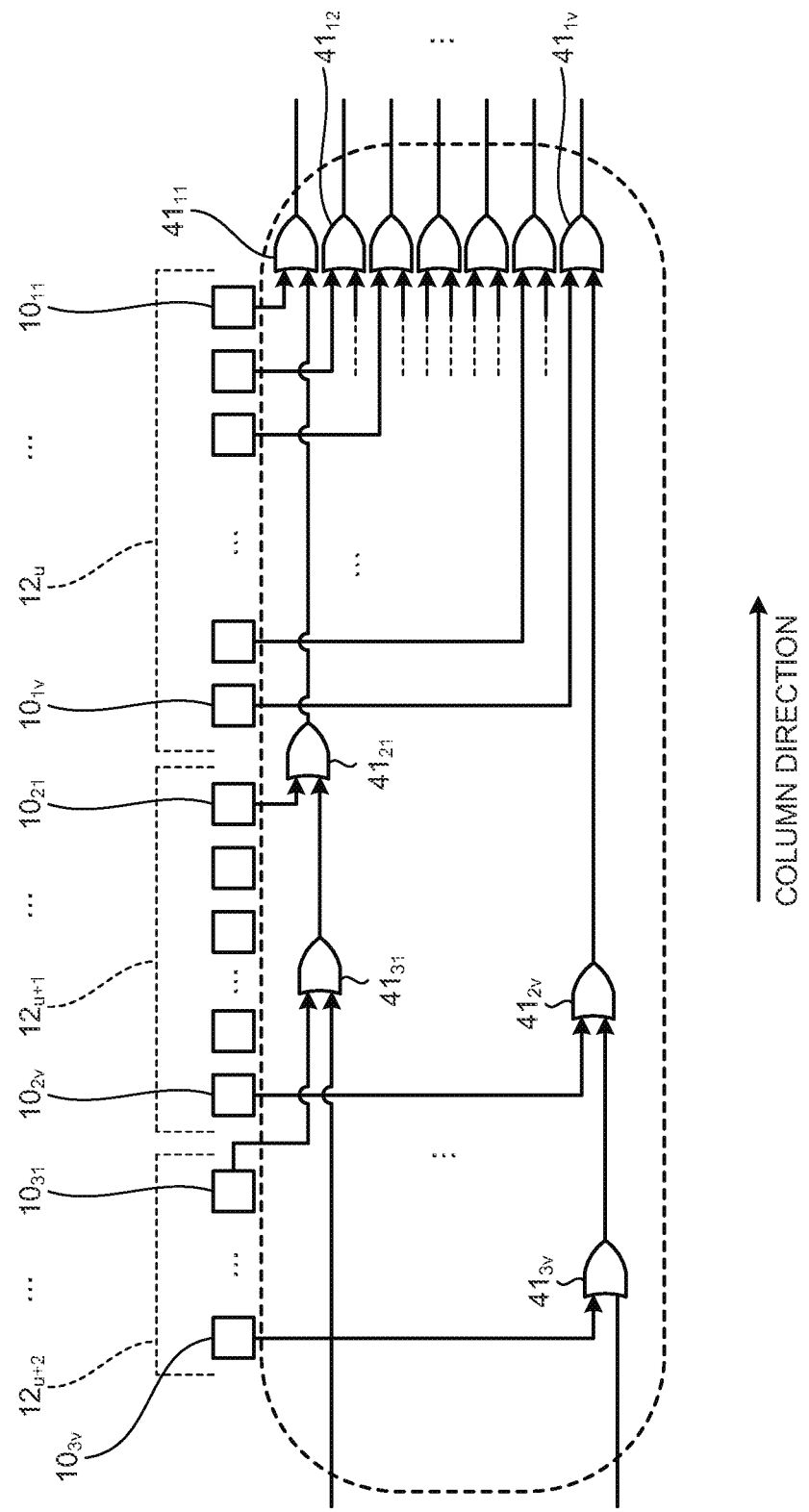
FIG. 9 is a view illustrating an example of a configuration for reading a signal Vpls from each pixel circuit according to the embodiment.

FIG. 9 is a view illustrating an example of a configuration for reading the signal Vpls from each of the pixel circuits 10 according to each of the embodiments. Note that the horizontal direction of the drawing is the column direction in FIG. 9 as indicated by an arrow in the drawing.

In each of the embodiments, a read wiring for reading the signal Vpls is shared for each predetermined number of pixel circuits 10 in the column direction. In the example of FIG. 9, the read wiring is shared for each of v pixel circuits 10. For example, groups $12_u$, $12_{u+1}$, $12_{u+2}$, and so on each including the v pixel circuits 10 arranged in a column are considered. The group $12_u$ includes pixel circuits $10_{11}$ to $10_{1v}$, the group $12_{u+1}$ includes pixel circuits $10_{21}$ to $10_{2v}$, and the group $12_{u+2}$ includes $10_{31}$ to $10_{3v}$.

In each of the groups $12_u$, $12_{u+1}$, $12_{u+2}$, and so on, read wirings are shared by the pixel circuits 10 whose positions in the groups correspond to each other. In the example of FIG. 9, the right side of the drawing is set as the head side of the position, and the read wirings are shared among the first pixel circuit $10_{11}$ of the group $12_u$, the first pixel circuit $10_{21}$ of the group $12_{u+1}$, the first pixel circuit $10_{31}$ of the group $12_{u+2}$, and so on. In the example of FIG. 9, the read wirings of the respective pixel circuits $10_{11}$, $10_{21}$, $10_{31}$, and so on are sequentially connected via OR circuits $41_{11}$, $41_{21}$, $41_{31}$, and so on, thereby sharing the plurality of read wirings.

For example, regarding the group $12_u$, OR circuits $41_{11}$, $41_{12}$, . . . , and $41_{1v}$ are provided respectively for the pixel circuits $10_{11}$ to $10_{1v}$ included in group $12_u$, and the read wirings of the pixel circuits $10_{11}$ to $10_{1v}$ are connected to first input ends thereof. In addition, regarding the group $12_{u+1}$, OR circuits $41_{21}$ to $41_{2v}$ are provided for the pixel circuits $10_{21}$ to $10^{2v}$ included in the group $12_{u+1}$, respectively. Similarly, regarding the group $12_{u+2}$, OR circuits $41_{31}$ to $41_{3v}$ are provided for the pixel circuits $10_{31}$ to $10_{3v}$ included in the group $12_{u+2}$, respectively.

Note that outputs of the respective OR circuits $41_{11}$ to $41_{1v}$ are input to, for example, the distance measurement processing unit 101.

When the pixel circuits $10_{11}$, $10_{21}$, and $10_{31}$ are taken an example, the OR circuit $41_{11}$ has the first input end connected with the read wiring of the pixel circuit $10_{11}$ and a second input end connected with an output of the OR circuit $41_{21}$. The OR circuit $41_{21}$ has the first input end connected with the read wiring of the pixel circuit $10_{21}$, and a second input end connected with an output of the OR circuit $41_{31}$. The OR circuit $41_{31}$ and the like are similarly configured.

For the configuration illustrated in FIG. 9, for example, the vertical control unit 102b performs control such that reading is not performed at the same time from the respective pixel circuits 10 at the corresponding positions in the respective groups $12_u$, $12_{u+1}$, $12_{u+2}$, and so on by the signal EN_SPAD_V. In other words, the vertical control unit 102b performs control such that reading is possible only from the pixel circuit 10 which is one of the plurality of pixel circuits 10 arranged every (v−1) columns. In the example of FIG. 9, the vertical control unit 102b performs control such that reading is not performed at the same time from, for example, the pixel circuit $10_{11}$, the pixel circuit $10_{21}$, and the pixel circuit $10_{31}$. The horizontal control unit 102a can also perform control for simultaneous reading in the column direction using the signal EN_F.

On the other hand, in the configuration illustrated in FIG. 9, the vertical control unit 102b can designate simultaneous reading from the v pixel circuits 10 arranged consecutively in a column. At this time, the vertical control unit 102b can designate the pixel circuits 10 to perform reading at the same time across the groups $12_n$, $12_{n+1}$, $12_{u+2}$, and so on.

That is, the v pixel circuits 10 consecutive in the column direction can simultaneously perform reading in the configuration illustrated in FIG. 9. For example, it is possible to designate simultaneous reading for v pixel circuits 10 that are arranged consecutively from the third pixel circuit $10_{13}$ from the head included in the group $12_u$ to the second pixel circuit $10_{22}$ from the head included in the group $12_{u+1}$.

In addition, when the simultaneous reading from v pixel circuits 10 arranged consecutively in a column is designated, the vertical control unit 102b performs control so as not to perform reading from pixel circuits 10 other than the row. Therefore, for example, the output of the OR circuit $41_{11}$ becomes the signal Vpls read from the pixel circuit 10 of any one of the pixel circuits $10_{11}$, $10_{21}$, $10_{31}$, and so on.

In this manner, it is possible to reduce the number of read wiring in units of columns by performing the connection of the read wiring of each of the pixel circuits 10 and the reading control for each of the pixel circuits 10.

Example of Scanning Method of Pixel Array According to Existing Technology

Figure 10:
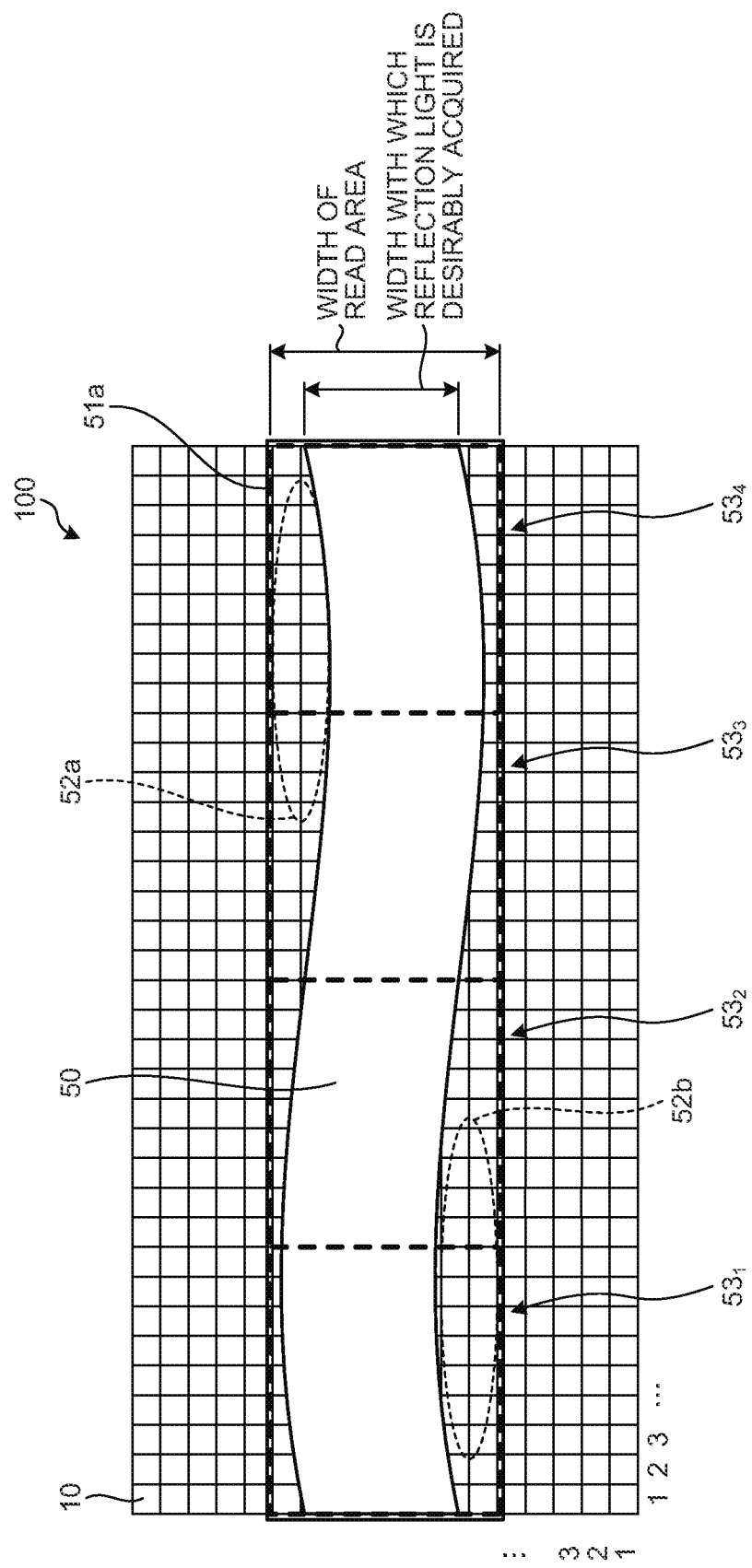
FIG. 10 is a view illustrating an example of a scanning method of a pixel array unit according to an existing technology.

Next, a scanning method of the pixel array unit 100 according to the existing technology will be schematically described prior to the description of the present disclosure. FIG. 10 is a view illustrating an example of the scanning method of the pixel array unit 100 according to the existing technology.

When light from a light source is scanned linearly and the reflection light thereof is received by the pixel array unit 100, there is a case where a scan trajectory of the light emitted from the light source has distortion or deviation and does not become linear. This distortion or deviation of the scan trajectory occurs due to, for example, the accuracy of a mechanism that scans the light emitted from the light source, and is distortion or deviation peculiar to a device. The distortion or deviation of the scan trajectory of the light emitted from the light source is reflected in the reflection light received by the pixel array unit 100. FIG. 10 illustrates an example in which a trajectory 50 of the reflection light received by the pixel array unit 100 meanders. In such a case, it is necessary to set a width (height) of a read area 51a to perform reading to be wider than a width (width of the trajectory 50 of the reflection light) for desirably acquiring the reflection light in consideration of the meandering of the trajectory 50.

In the example of FIG. 10, reading is performed in units of pixels $53_1$, $53_2$, $53_3$, and $53_4$ each including the plurality of pixel circuits 10. More specifically, in each of the pixels $53_1$ to $53_4$, exposure and photon detection are performed in each of the pixel circuits 10 included in each of the pixels $53_1$ to $53_4$ to generate the signal Vpls. For example, in the pixel $53_1$, histogram generation and peak detection are performed based on the signal Vpls read from each of the pixel circuits 10 included in the pixel $53_1$, and distance measurement is executed.

Here, the read area 51a is set so as to include the trajectory 50 of the reflection light according to the existing technology, and thus, the signal Vpls is also read from the pixel circuit 10 included in areas 52a and 52b where the reflection light is not received. The pixel circuits 10 included in the areas 52a and 52b are pixel circuits 10 that do not receive the reflection light of the light emitted from the light source and are unnecessary for distance measurement.

As the reading from the unnecessary pixel circuit 10 is performed, unnecessary power is consumed in the pixel array unit 100 and the distance measurement processing unit 101 that performs signal processing on the signal Vpls read from the pixel array unit 100. In addition, since a reading range is widened with respect to the trajectory 50 of the reflection light, the number of read wirings for reading from each of the pixel circuits 10, which requires timing care for the signal, increases as compared with the originally required number of wirings. Further, there is a possibility that the influence of disturbed light (ambient light) increases because the reading from the unnecessary pixel circuit 10 is performed.

First Embodiment

Next, the first embodiment of the present disclosure will be described. In a first embodiment of the present disclosure, a pixel array unit 100 can select a pixel circuit 10 to perform reading according to a trajectory 50 of reflection light.

Figure 11:
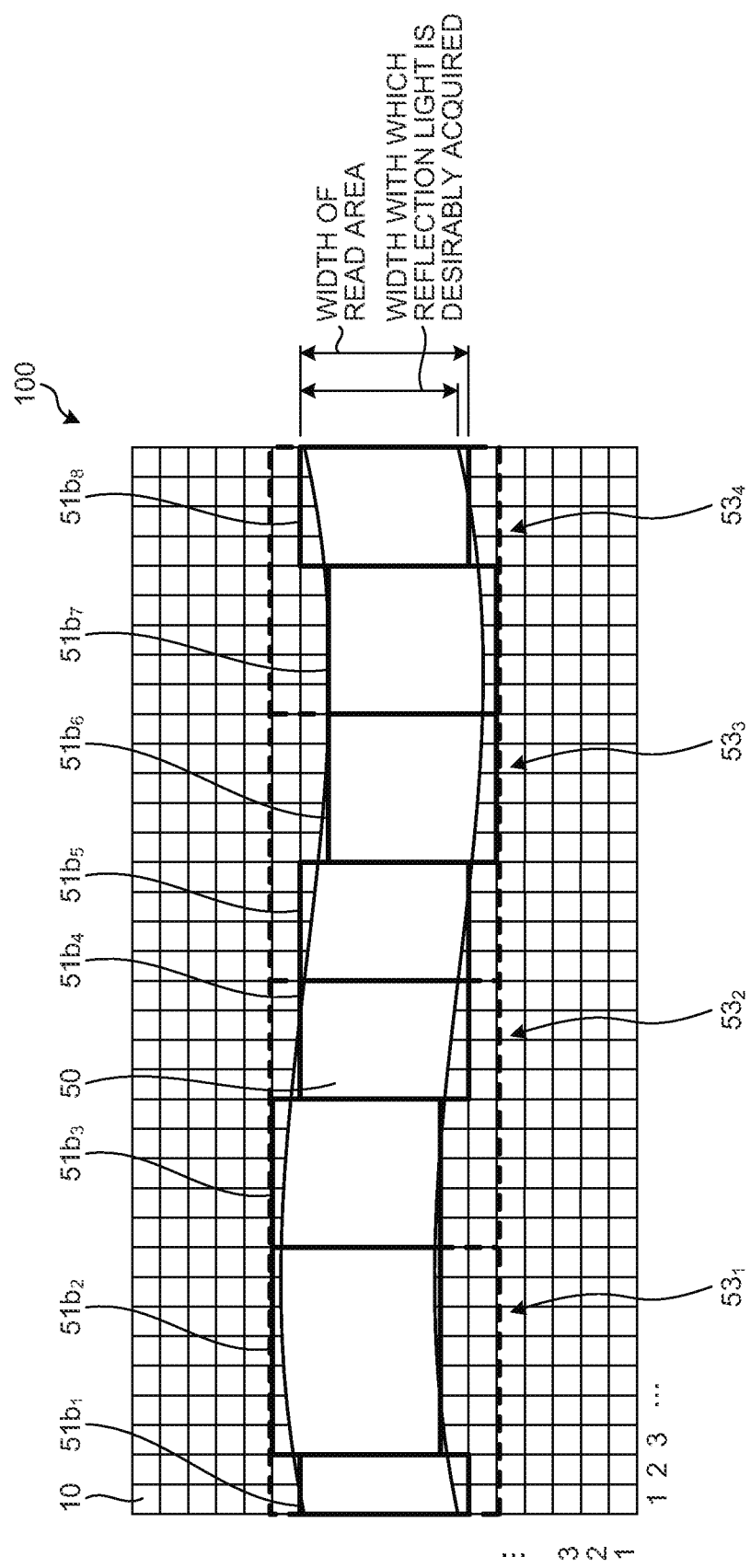
FIG. 11 is a view illustrating an example of a scanning method of the pixel array unit according to the embodiment.

FIG. 11 is a view illustrating an example of a scanning method of the pixel array unit 100 according to the first embodiment. In the first embodiment, a read area is set in a unit of the pixel circuit 10 or in a unit of an element 11 including a plurality of the pixel circuits 10 according to the trajectory 50 of the reflection light. In the example of FIG. 10, each of read areas $51b_1$ to $51b_8$ is set in units of the pixel circuits 10 according to the trajectory 50 of the reflection light emitted to the pixel array unit 100.

For example, for a pixel $53_1$, the respective the pixel circuits 10 included in the read areas $51b_1$ and $51b_2$ over the trajectory 50 of the reflection light among the pixel circuits 10 included in the pixel $53_1$ are designated as the pixel circuits 10 to perform reading. Similarly, for a pixel $53_2$, the respective the pixel circuits 10 included in the read areas $51b_3$ and $51b_4$ over the trajectory 50 of the reflection light among the pixel circuits 10 included in the pixel $53_2$ are designated as the pixel circuits 10 to perform reading. Similarly, for pixels $53_3$ and $53_4$, the respective pixel circuits 10 included in the read areas $51b_5$ and $51b_6$ and in the read areas $51b_7$ and $51b_8$ are designated as the pixel circuits 10 to perform reading.

Since each of the read areas $51b_1$ to $51b_8$ is set in this manner, it is possible to make a width (height) of each of the read areas $51b_1$ to $51b_8$ substantially equal to a width (width of the trajectory 50 of the reflection light) for desirably acquiring the reflection light. As a result, the number of pixel circuits 10 to perform reading can be suppressed to the minimum necessary as compared with the scanning method of the existing technology described above, and the power consumption can be reduced. In addition, the width of each of the read areas $51b_1$ to $51b_8$ is smaller than that of the scanning method of the existing technology, it is possible to reduce the number of read wirings for reading from each of the pixel circuits 10.

Further, in the scanning method according to the first embodiment, areas 52a and 52b illustrated in FIG. 10 where the reflection light is not received can be made extremely small, so that it is possible to suppress the influence of disturbed light or the like.

Figure 12A:
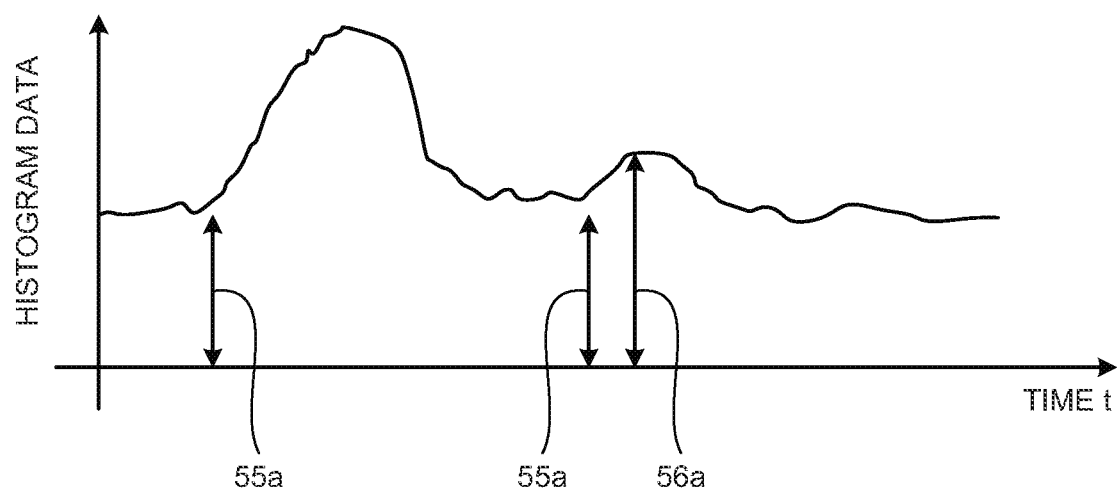
FIG. 12A is a graph illustrating an example of a histogram when reading of each pixel circuit is performed by the scanning method of the existing technology.

The suppression of the influence of disturbed light by the scanning method according to the first embodiment will be described more specifically with reference to FIGS. 12A and 12B. FIG. 12A is a graph illustrating an example of a histogram when reading of each of the pixel circuits 10 is performed by the scanning method of the existing technology illustrated in FIG. 10. In addition, FIG. 12B is a graph illustrating an example of a histogram when reading of each of the pixel circuits 10 is performed by the scanning method according to the first embodiment illustrated in FIG. 11.

Figure 12B:
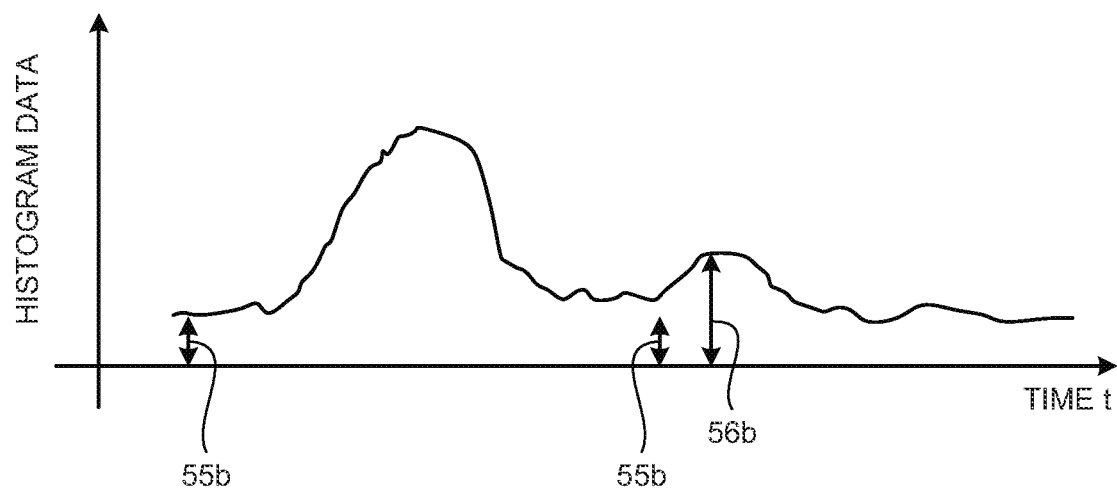
FIG. 12B is a graph illustrating an example of a histogram when reading of each pixel circuit is performed by the scanning method according to the embodiment.

Note that FIGS. 12A and 12B illustrates that, for example, a histogram as described with reference to FIG. 2 is subjected to low-pass filter processing to make the histogram approximate to a curve.

In FIG. 12A, an offset 55a includes a measured value according to a signal Vpls read from the unnecessary pixel circuit 10 included in the areas 52a and 52b where the reflection light is not received. On the other hand, the reading from each of the pixel circuits 10 included in these areas 52a and 52b is not performed in FIG. 12B, and thus, an offset 55b is smaller than the offset 55a illustrated in FIG. 12A.

Here, small peaks 56a and 56b in the histogram are considered. The peak 56b and offset according to the scanning method of the first embodiment illustrated in FIG. 12B do not include measured values for the areas 52a and 52b in which the reflection light is not received as illustrated in FIG. 10. Therefore, a value of a ratio of the peak 56b relative to the offset 55b is larger than a value of a ratio of the peak 56a relative to the offset 55a according to the scanning method of the existing technology. Therefore, it is easy to detect a peak in the histogram based on the scanning method according to the first embodiment as compared with the histogram based on the scanning method according to the existing technology, and it is possible to perform distance measurement with higher accuracy by applying the scanning method according to the first embodiment.

More Specific Description of Scanning Method According to First Embodiment

Next, the scanning method in the pixel array unit 100 according to the first embodiment will be described more specifically. First, sharing of read wirings of the respective pixel circuits 10 will be described with reference to FIGS. 13, and 14A and 14B.

Figure 13:
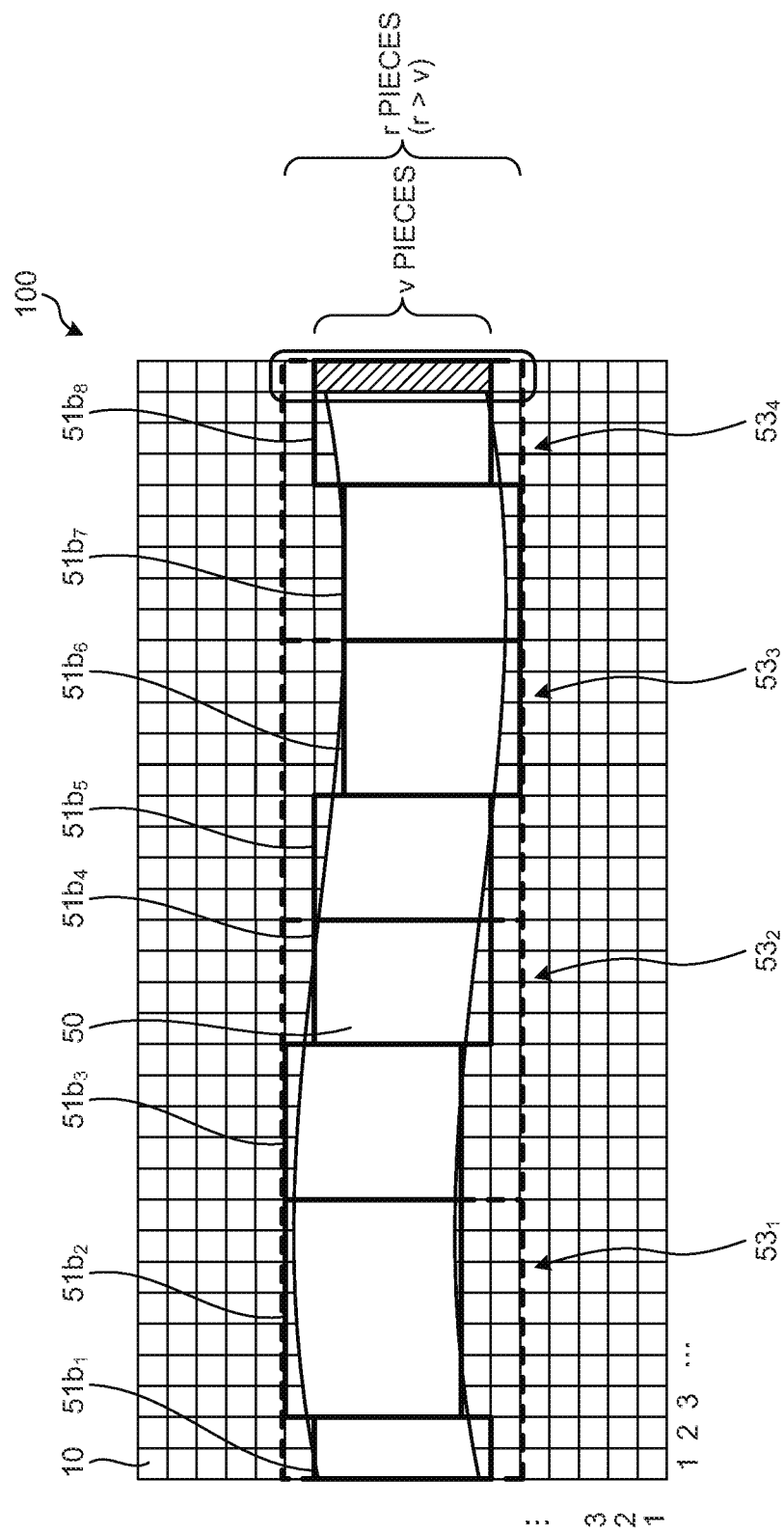
FIG. 13 is a view illustrating a setting example of a read area corresponding to a trajectory of meandering reflection light.

FIG. 13 is a view equivalent to FIG. 11 described above, and illustrates an example in which each of the read areas $51b_1$ to $51b_8$ is set according to the trajectory 50 of the meandering reflection light. Here, it is assumed that an area to be desirably read per column in the pixel array unit 100 includes v pixel circuits 10 which is the number of pixel circuits 10 which are consecutively arranged in a column and can be simultaneously read by a horizontal control unit 102a. In addition, it is assumed that a maximum width (height) of deviation for each column according to the trajectory 50 in the area to be desirably read includes r (r>v) pixel circuits 10.

Here, according to the existing technology described with reference to FIG. 10, when reading of the pixel circuit 10 at the position irradiated with the reflection light is performed, it is necessary to set the r pixel circuits 10 for each column in an on state (readable state) and to prepare a read wiring for each of the r pixel circuits 10.

On the other hand, in the first embodiment, it is possible to control reading in units of the pixel circuits 10 using signals XEN_SPAD_V and XEN_SPAD_H and a signal EN_F. In addition, a vertical control unit 102b can designate simultaneous reading for the v pixel circuits 10 arranged consecutively in the column direction as described with reference to FIG. 9. In addition, the vertical control unit 102b can designate only one pixel circuit 10 of the plurality of pixel circuits 10 arranged every (v−1) columns to perform reading.

Figure 14A:
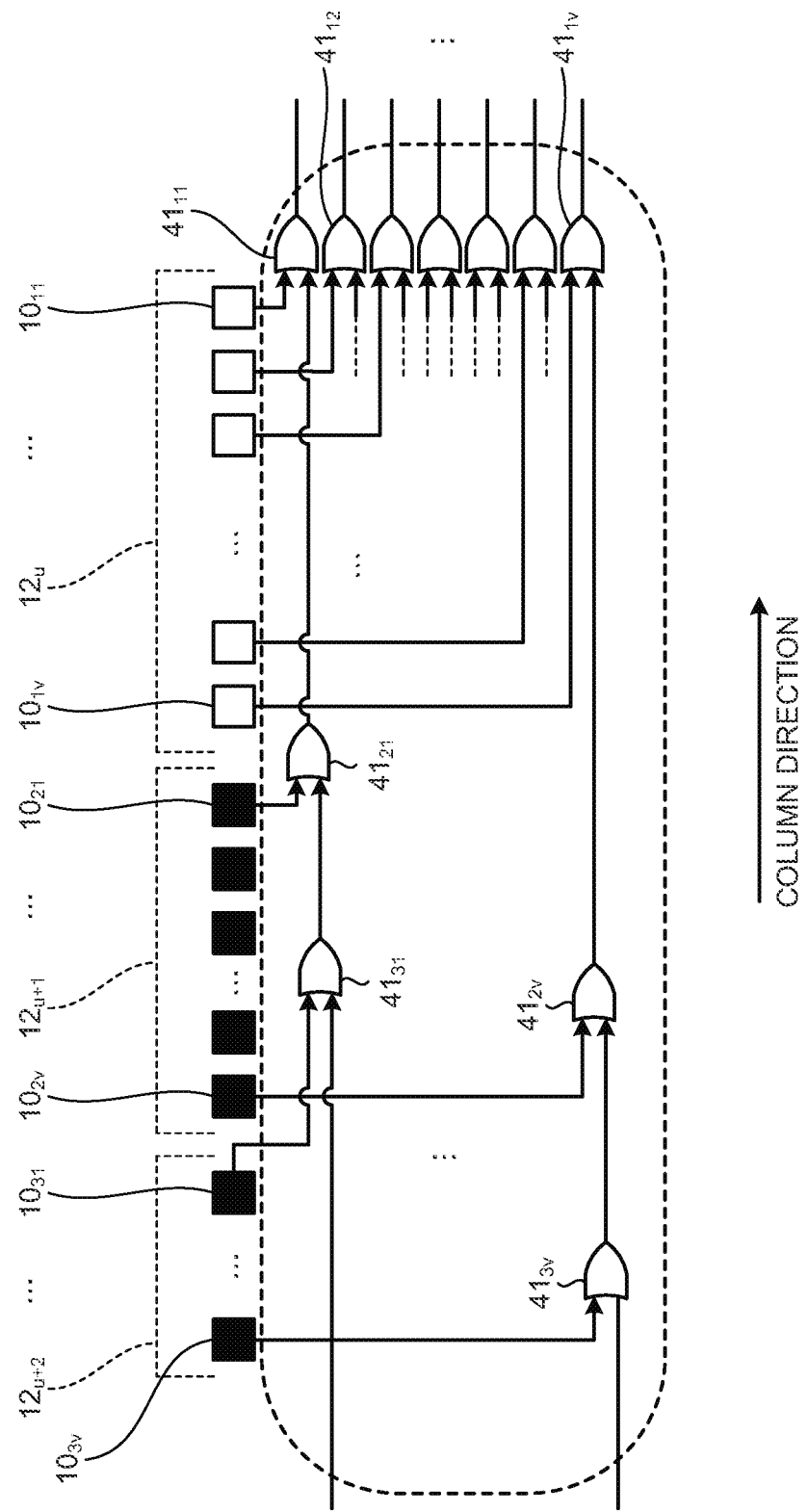
FIG. 14A is a view for more specifically describing sharing of a read wiring between the respective pixel circuits according to the embodiment.
Figure 14B:
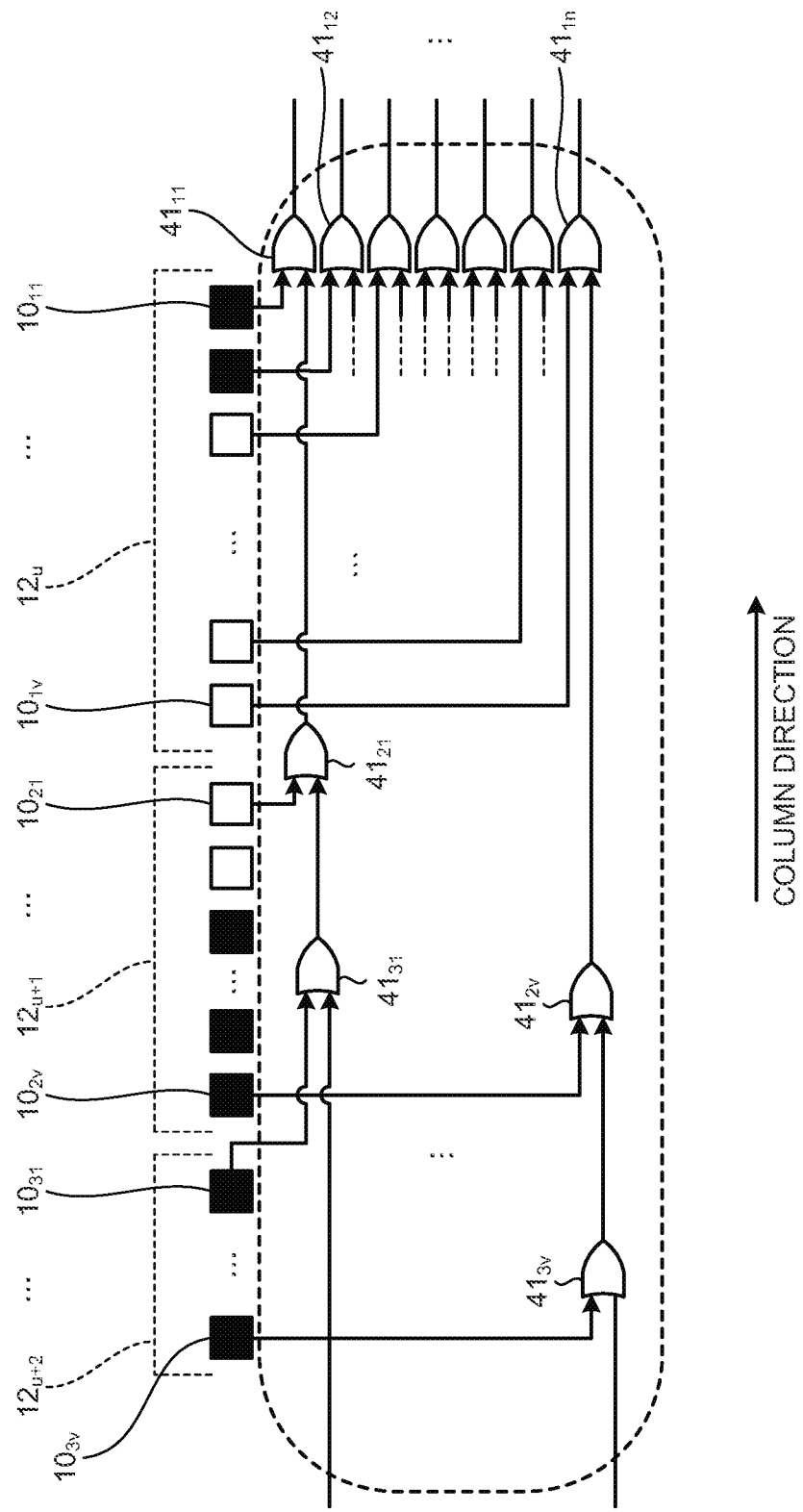
FIG. 14B is a view for more specifically describing the sharing of the read wiring between the respective pixel circuits according to the embodiment.

FIGS. 14A and 14B are views for more specifically describing the sharing of the read wirings of the respective pixel circuits 10 according to the first embodiment. Note that, in FIGS. 14A and 14B, a black square indicates the pixel circuit 10 for reading is not performed by the vertical control unit 102b or controlled to be turned off, and a white square indicates the pixel circuit 10 controlled to perform reading.

As illustrated in FIG. 14A, the vertical control unit 102b designates simultaneous reading for v pixel circuits $10_{11}$ to $10_{1v}$ arranged consecutively in a column and corresponding to an area to be desirably read in the column. The pixel circuits $10_{11}$ to $10_{1v}$ are included in one group $12_u$.

For example, the vertical control unit 102b supplies each of the pixel circuits $10_{11}$ to $10_{1v}$ with the signals XEN_SPAD_V and XEN_SPAD_H for turning off transistors 1102 and 1103, respectively, and supplies a signal EN_PR for turning on a switch unit 1101. In addition, the horizontal control unit 102a sets the signal EN_F supplied to each of the pixel circuits $10_{11}$ to $10_{1v}$ to a high state. As a result, each of the pixel circuits $10_{11}$ to $10_{1v}$ can be set to a simultaneously readable state.

In addition, the vertical control unit 102b controls the other pixel circuits 10 arranged in the column so as not to perform reading. For example, the horizontal control unit 102a supplies the other pixel circuits 10 with, for example, the signal XEN_SPAD_V for turning on the transistor 1102 and the signal EN_PR for turning off the switch unit 1101. In addition, the horizontal control unit 102a sets the signal EN_F supplied to the other pixel circuits 10 to a low state. As a result, the other pixel circuits 10 are set to a state where reading is not performed.

FIG. 14B is a view illustrating an example of designation of reading in a column different from the column illustrated in FIG. 14A (for example, a column adjacent to the column illustrated in FIG. 14A). In the example of FIG. 14B, simultaneous reading is designated for v pixel circuits $10_{13}$ to $10_{22}$ corresponding to an area to be desirably read in the different column. The pixel circuits $10_{13}$ to $10_{22}$ are included across two groups $12_u$ and $12_{u+1}$. In addition, the horizontal control unit 102a and the vertical control unit 102b perform control such that reading is not performed for the other pixel circuits 10 arranged in the column using the signals XEN_SPAD_H, XEN_SPAD_V, EN_F, and EN_PR.

With such a configuration, it is sufficient to prepare the read wirings for the v pixel circuits 10 in the configuration of the first embodiment, and it is possible to reduce the number of read wirings as compared with the existing technology. In addition, each of the pixel circuits 10 arranged in an area beyond the area to be read is controlled so as not to be readable at the same time. Read wiring that requires care for wiring delay is shared in units of 100 psec or less. Therefore, it is possible to reduce the number of wiring delay care targets and the subsequent circuits that require high-speed operation.

Further, the vertical control unit 102b stops supply of a power supply voltage Vdd to each of the pixel circuits 10 arranged in an area beyond the area to be desirably read using the signal EN_PR. As a result, the power consumption in the pixel circuit 10, which is not irradiated with the reflection light, is suppressed, and the power consumption of the entire pixel array unit 100 is also reduced.

Note that whether or not to perform reading (on/off of the pixel circuit 10) is controlled in units of the pixel circuits 10 in the above description, but this is not limited to this example. For example, the horizontal control unit 102a and the vertical control unit 102b can control the on/off of the pixel circuits 10 for each block including (p×q) pixel circuits 10 in p rows×q columns. For example, the on/off of the pixel circuit 10 can be controlled in the unit of the block of the element 11 including nine pixel circuits 10 in 3 rows×3 columns described with reference to FIG. 7. In this control in units of blocks, the unit of the on/off control can be adjusted by a trade-off with a signal line for turning on/off the pixel circuit 10 in units of blocks (for example, signal line for the signal EN_F).

Specific Example of Designation of Read Area According to First Embodiment

Figure 15:
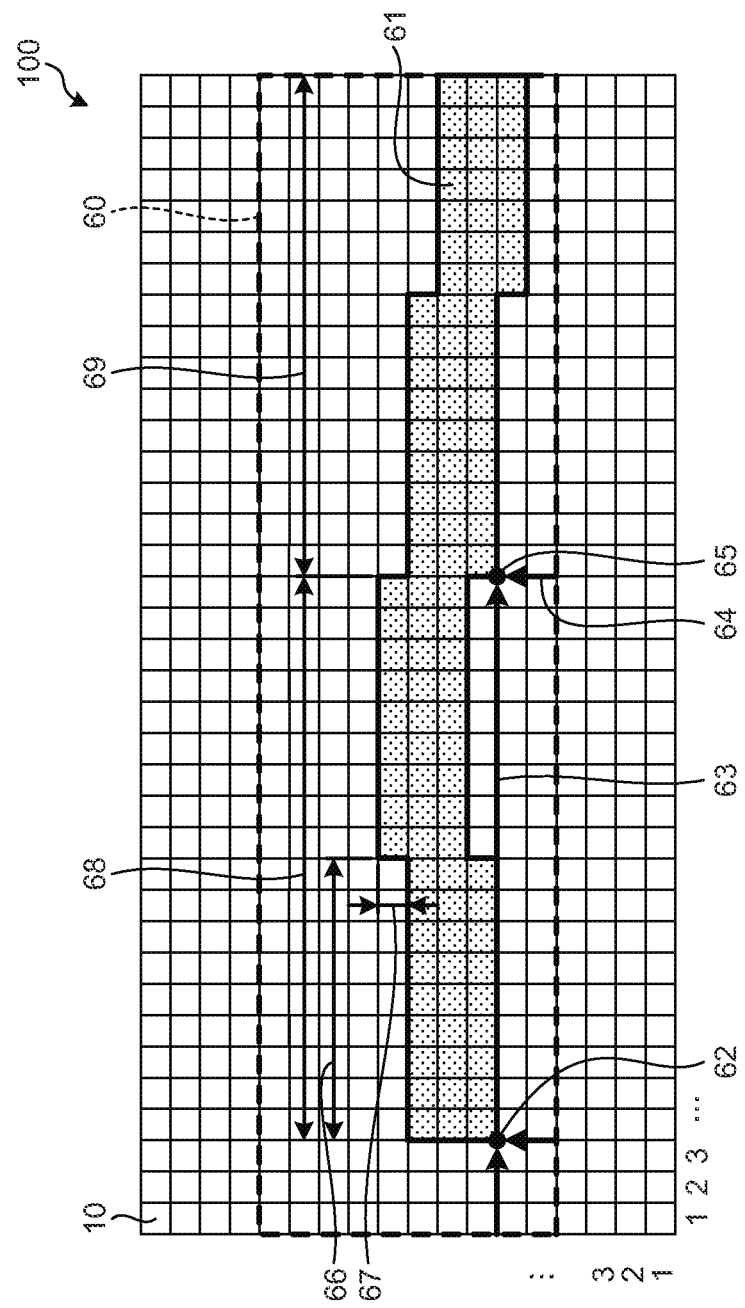
FIG. 15 is a view illustrating an example of a method for designating each read area according to the embodiment.
Figure 16:
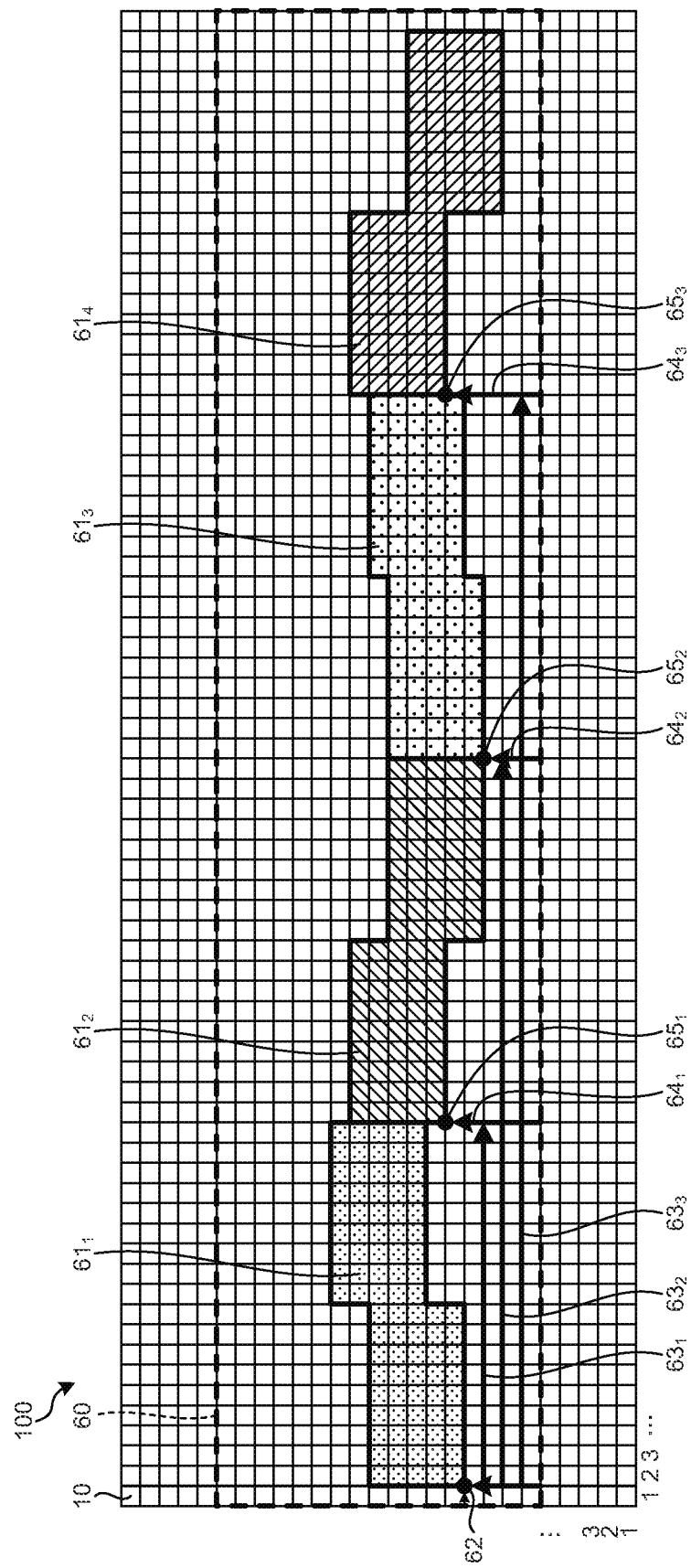
FIG. 16 is a view illustrating an example of designating a plurality of read areas assuming division of a light source according to the embodiment.

With reference to FIGS. 15 and 16, the designation of the read area according to the trajectory 50 of the reflection light will be described more specifically. FIG. 15 is a view illustrating an example of a method for designating each read area according to the first embodiment. In FIG. 15, a read area 61 is designated using an effective area 60 in the pixel array unit 100 as a reference. A base point position 62 of the read area 61 is set to, for example, a left end of the read area 61 and a position of a lower end of the left end, and the base point position 62 is designated based on a position from a left end and a lower end of the effective area 60.

In addition, in the example of FIG. 15, the read area 61 is designated to be divided into a range 68 on the left side and a range 69 on the right side in FIG. 15. A division reference position 65 is designated horizontally as a horizontal offset 63 with respect to the base point position 62 of the read area 61. In addition, the reference position 65 is designated vertically as a height 64 with the lower end of the effective area 60 as a reference. In addition, a position where the height in the vertical direction changes in the range 68 is designated using an adjustment interval 66, and the changing height is designated using an adjustment amount 67. This is similarly applied even to the range 69.

In the example of FIG. 15, each parameter (each designated value) in the range 68 is stored in an adjustment register #0, which is one of registers of an overall control unit 103, for example, and each parameter in the range 69 is stored in an adjustment register #1 which is one of the registers of the overall control unit 103. The parameters (designated values) in the ranges 68 and 69 may be stored in advance in the adjustment registers #0 and #1, or may be stored by an external input with respect to the overall control unit 103.

For example, the overall control unit 103 reads the respective parameters to perform each designation described above from the register, and generates, for example, the signals EN_SPAD_H, EN_SPAD_V, EN_F, and EN_PR based on the read parameters. The overall control unit 103 passes the generated signals EN_SPAD_H and EN_F to the horizontal control unit 102a. The horizontal control unit 102a supplies the signal XEN_SPAD_H based on the passed signal EN_SPAD_H to a predetermined column of the pixel array unit 100. In addition, the horizontal control unit 102a supplies the passed signal EN_F to a plurality of predetermined columns (for example, 3 columns) of the pixel array unit 100 and a predetermined row at a predetermined cycle. Further, the overall control unit 103 passes the generated signals EN_SPAD_V and EN_PR to the vertical control unit 102b. The vertical control unit 102b supplies the passed signal EN_PR and the signal XEN_SPAD_V based on the signal EN_SPAD_V to a predetermined line of the pixel array unit 100.

FIG. 16 is a view illustrating an example of designating a plurality of read areas assuming division of a light source according to the first embodiment. For example, a light source unit 2 (see FIG. 3) is constituted by four laser diodes, and read areas $61_1$, $61_2$, $61_3$, and $61_4$ corresponding to the respective laser diodes are designated. In this case, base point positions $65_1$, $65_2$, and $65_3$ of the read areas $61_2$, $61_3$, and $61_4$ are designated for example, for the base point position 62 of the leftmost read area $61_1$.

For example, the base point position $65_1$ of the read area $61_2$ is designated by a horizontal offset $63_1$ with respect to the base point position 62 and a height $64_1$ with the lower end of the effective area 60 as the reference. Similarly, the base point positions $65_2$ and $65_3$ of the read areas $61_3$ and $61_4$ are designated, respectively, by horizontal offsets $63_2$ and $63_3$ with respect to the base point position 62 and heights $64_2$ and $64_3$ with the lower end of the effective area 60 as the reference.

In addition, in each of the read areas $61_1$ to $61_4$, a position where the height in the vertical direction changes is designated using the adjustment interval 66, and a changing height is designated using the adjustment amount 67 in the same manner as in FIG. 15 although omitted in FIG. 16. Each designated value is stored in the adjustment register as the parameter to designate the read area.

For example, the overall control unit 103 reads the parameters to perform each designation described above from the register, and generates, for example, the respective signals EN_SPAD_H, EN_SPAD_V, EN_F, and EN_PR based on the respective read parameters, which is similar to the description in FIG. 15. The overall control unit 103 passes the generated signals EN_SPAD_H and EN_F to the horizontal control unit 102a, and passes the signal EN_S-PAD_VEN_PR to the vertical control unit 102b.

Calibration Process Applicable to First Embodiment

Next, a calibration process of a read area according to the first embodiment will be described. When distortion or deviation of the trajectory 50 of the reflection light applied to the pixel array unit 100 is peculiar to a device as described above, the trajectory 50 can be acquired in advance. Based on the acquired information on the trajectory 50, the respective parameters described in FIGS. 15 and 16 are obtained and stored in the adjustment register of the overall control unit 103.

Figure 17:
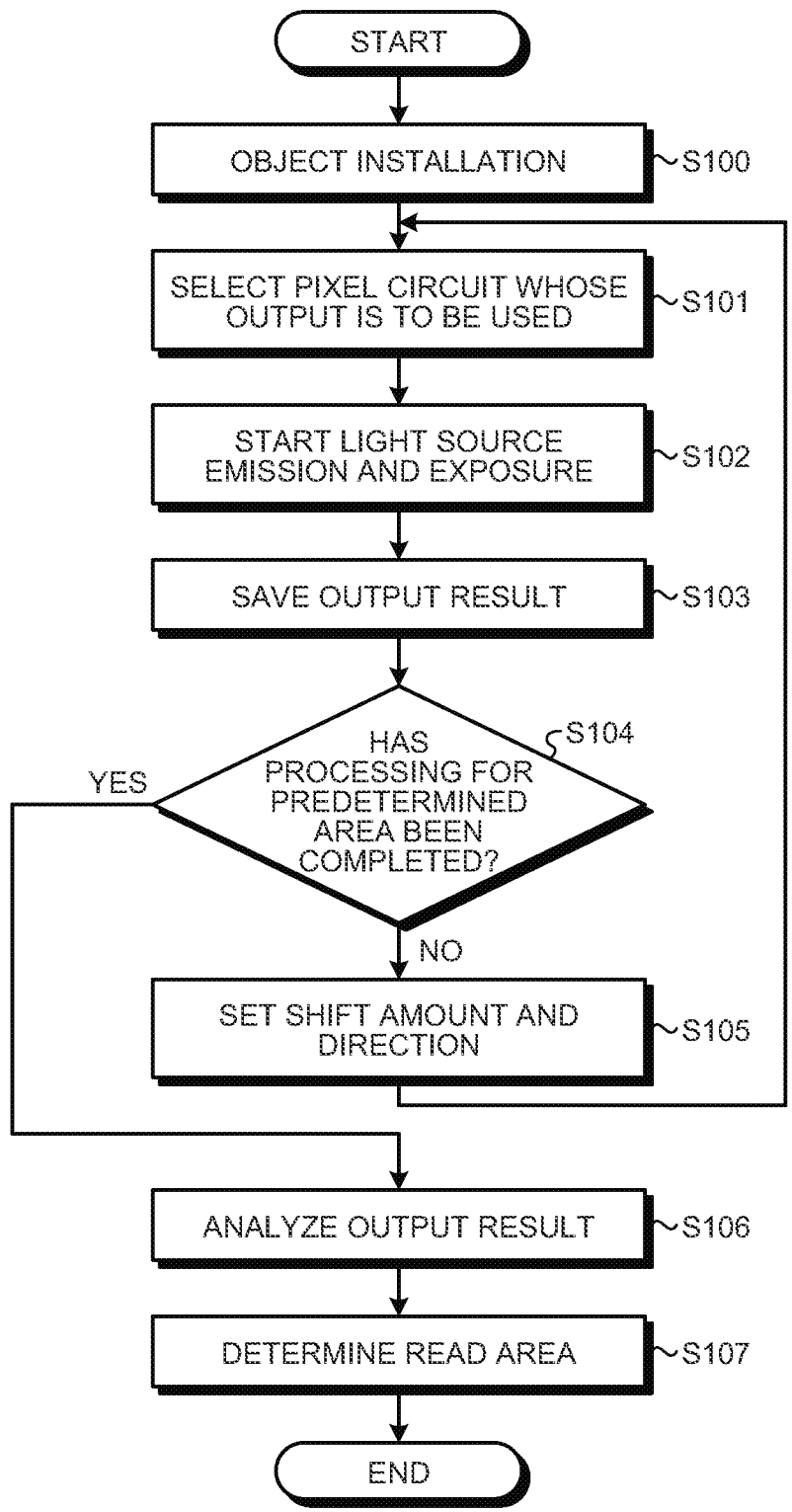
FIG. 17 is a flowchart of an example illustrating a calibration process of the read area according to the embodiment.

FIG. 17 is a flowchart of an example illustrating the calibration process of the read area according to the first embodiment. For example, an object is placed at a fixed distance to a distance measurement device 1 (see FIG. 4) (Step S100). The object preferably has high reflectance and high uniformity, such as white paper or board.

Next, in Step S101, the pixel circuit 10 whose output is to be used is selected. Only one pixel circuit 10 may be designated, or a plurality of pixel circuits 10 included in a range narrower than, for example, the pixel $53_1$ to which the measured value is added may be selected. Here, a description will be given assuming that one pixel circuit 10 is selected.

Figure 18:
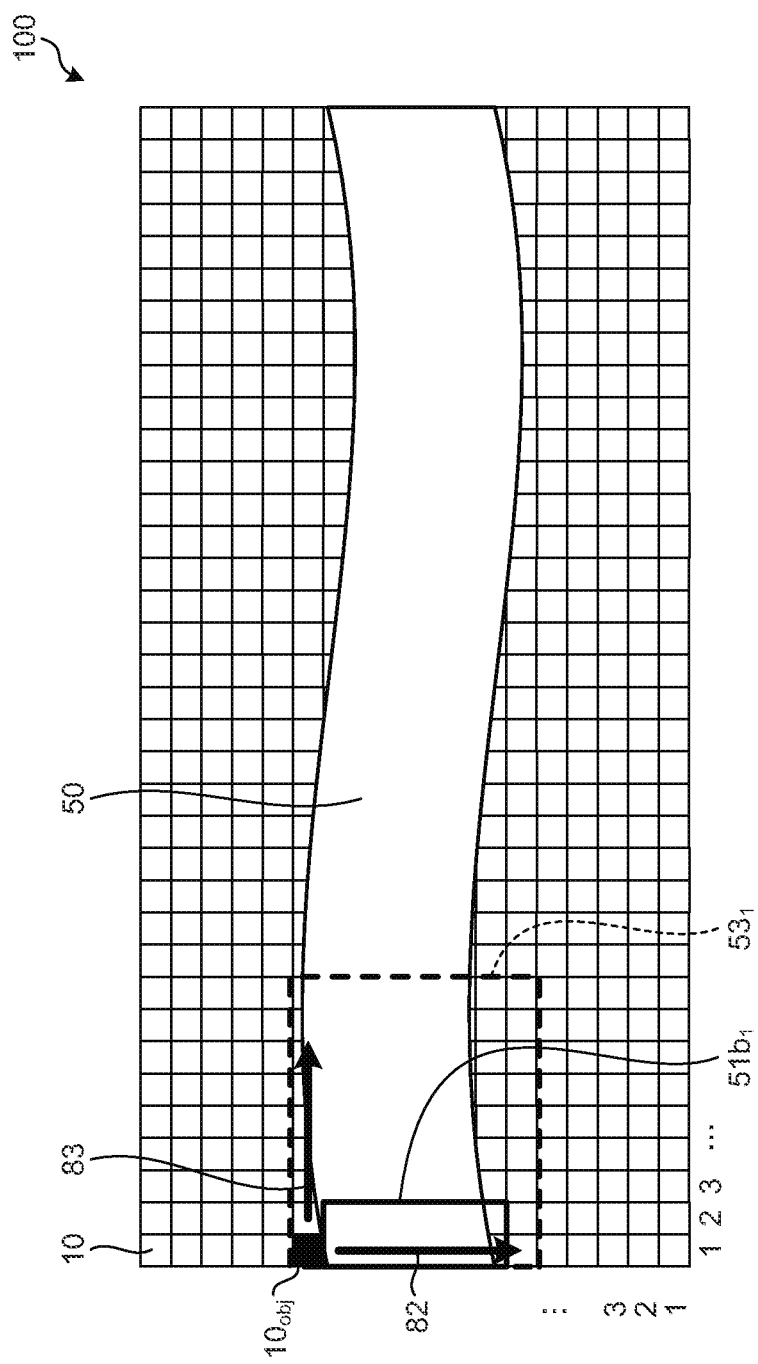
FIG. 18 is a schematic view for describing the calibration process of the read area according to the embodiment.

FIG. 18 is a schematic view for describing the calibration process of the read area according to the first embodiment. In FIG. 18, it is assumed that a pixel circuit $10_{obj}$ is selected in Step S101. In the subsequent Step S102, the distance measurement device 1 causes a light source unit 2 to emit light under the control of, for example, the overall control unit 103, and starts exposure in the pixel circuit $10_{obj}$. In the subsequent Step S103, a distance measurement processing unit 101 in the distance measurement device 1 measures a light reception timing based on the signal Vpls output from the pixel circuit $10_{obj}$, and stores the measured value.

Note that the processing in Step S102 and Step S103 may be repeated a plurality of times to generate a histogram based on the output of the pixel circuit $10_{obj}$ at a predetermined position.

In the subsequent Step S104, the overall control unit 103 determines whether or not the processing from Steps S101 to S103 has been completed for a predetermined area. For example, the overall control unit 103 determines that the processing for the predetermined area has been completed when the processing for all the pixel circuits 10 in the pixel array unit 100 or the effective area 60 has been completed. Without being limited thereto, it may be determined that the processing for the predetermined area has been completed when the processing has been completed for all the pixel circuits 10 included in the pixel $53_1$, and another area may be additionally set to determine whether or not the processing has been completed within the set area.

When determining that the processing for the predetermined area has not been completed (Step S104, "No"), the overall control unit 103 shifts the processing to Step S105. In Step S105, the overall control unit 103 sets the shift amount and direction to designate the pixel circuit 10 whose output is to be used next. For example, the overall control unit 103 sets a position shifted by one pixel circuit 10 in the vertical direction indicated by an arrow 82 or the horizontal direction indicated by an arrow 83 with respect to the position of the pixel circuit $10_{obj}$. The overall control unit 103 returns the processing to Step S101, designates the pixel circuit 10 at the position set in Step S105 as the pixel circuit $10_{obj}$ whose output is to be newly used, executes the processing in Step S102 and the subsequent steps, and stores a measured value.

When it is determined in Step S104 that the processing for the predetermined area has been completed (Step S104, "Yes"), the overall control unit 103 shifts the processing to Step S106. In Step S106, the overall control unit 103 analyzes an output result obtained by the processing in Steps S101 to S105, that is, the measured value stored in Step S103. In the subsequent Step S107, the overall control unit 103 determines a read area based on the analysis result in Step S106. For example, the overall control unit 103 determines whether or not a position is appropriate as the position to be included in the read area based on the reaction frequency in the pixel circuit $10_{obj}$ at each position.

The overall control unit 103 stores the respective parameters indicating the read area determined in Step S107 in the register. As a result, for example, the read area $51b_1$ is set.

The process according to the flowchart of FIG. 17 can be executed by a user who uses an electronic device 6 including the distance measurement device 1 at the time of using a distance measurement function of the distance measurement device 1 and can be used to correct the read area. Without being limited thereto, a manufacturer may execute the process according to the flowchart to determine the read area at the time of shipment of the electronic device 6 including the distance measurement device 1. Furthermore, regardless of the process of the flowchart of FIG. 17, the trajectory 50 when reflection light of light from the light source unit 2 is received by the pixel array unit 100 may be estimated according to a mounting position of the light source unit 2 or the like in an assembly process of the electronic device 6 including the distance measurement device 1 or the like, and the respective parameters indicating the read area may be generated based on the estimation result and stored in the register.

Second Embodiment

Figure 19:
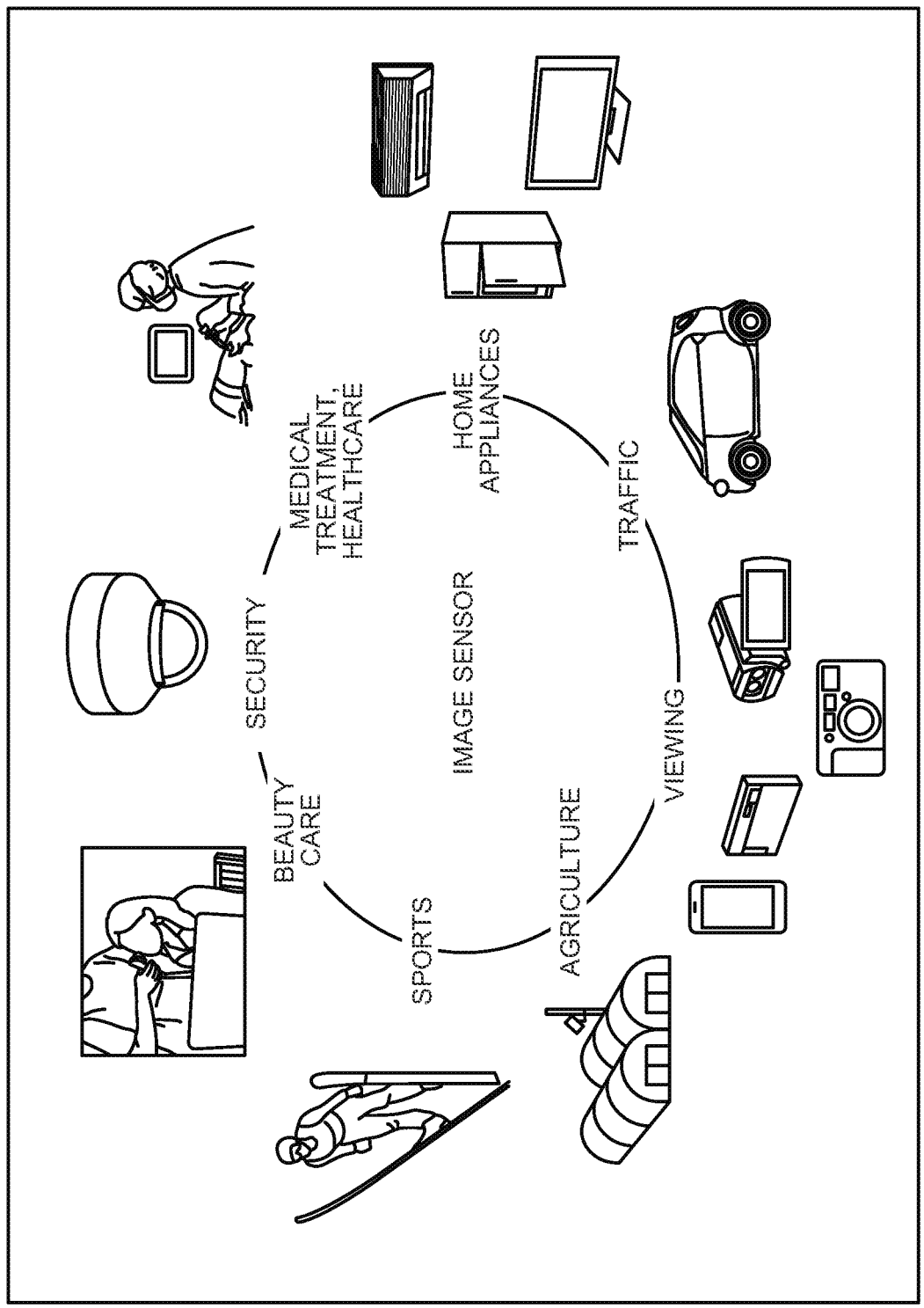
FIG. 19 is a view illustrating use examples according to a second embodiment in which a distance measurement device according to a first embodiment is used.

Next, an application example of the first embodiment of the present disclosure will be described as a second embodiment of the present disclosure. FIG. 19 is a view illustrating use examples according to the second embodiment in which the distance measurement device 1 according to the first embodiment described above is used.

The above-described distance measurement device 1 can be used in various cases for sensing light such as visible light, infrared light, ultraviolet light, and X-ray as will be described below.

- A device that captures an image used for viewing, such as a digital camera and a mobile device with a camera function.
- A device used for traffic, such as in-vehicle sensors that capture the front, rear, surroundings, interior, and the like of an automobile in order for safe driving such as automatic stop and recognition of a driver's condition, a surveillance camera that monitors a traveling vehicle and a road, and a distance measurement sensor that measures a distance between vehicles.
- A device used in home appliances, such as a TV, a refrigerator, and an air conditioner to capture a user's gesture and operate the device according to the gesture.
- A device used for medical treatment and healthcare, such as an endoscope and a device that performs angiography by receiving infrared light.
- A device used for security, such as a surveillance camera for crime prevention and a camera for personal authentication.
- A device used for beauty care, such as a skin measuring device that captures a skin and a microscope that captures a scalp.
- A device used for sports, such as an action camera and a wearable camera for sports applications.
- A device used for agriculture, such as a camera for monitoring conditions of a field and a crop.

Additional Application Example of Technology according to Present Disclosure

Application Example to Moving Object

The technology according to the present disclosure may be further applied to a device mounted on various moving objects such as a vehicle, an electric vehicle, a hybrid electric vehicle, a motorcycle, a bicycle, a personal mobility, an airplane, a drone, a ship, and a robot.

Figure 20:
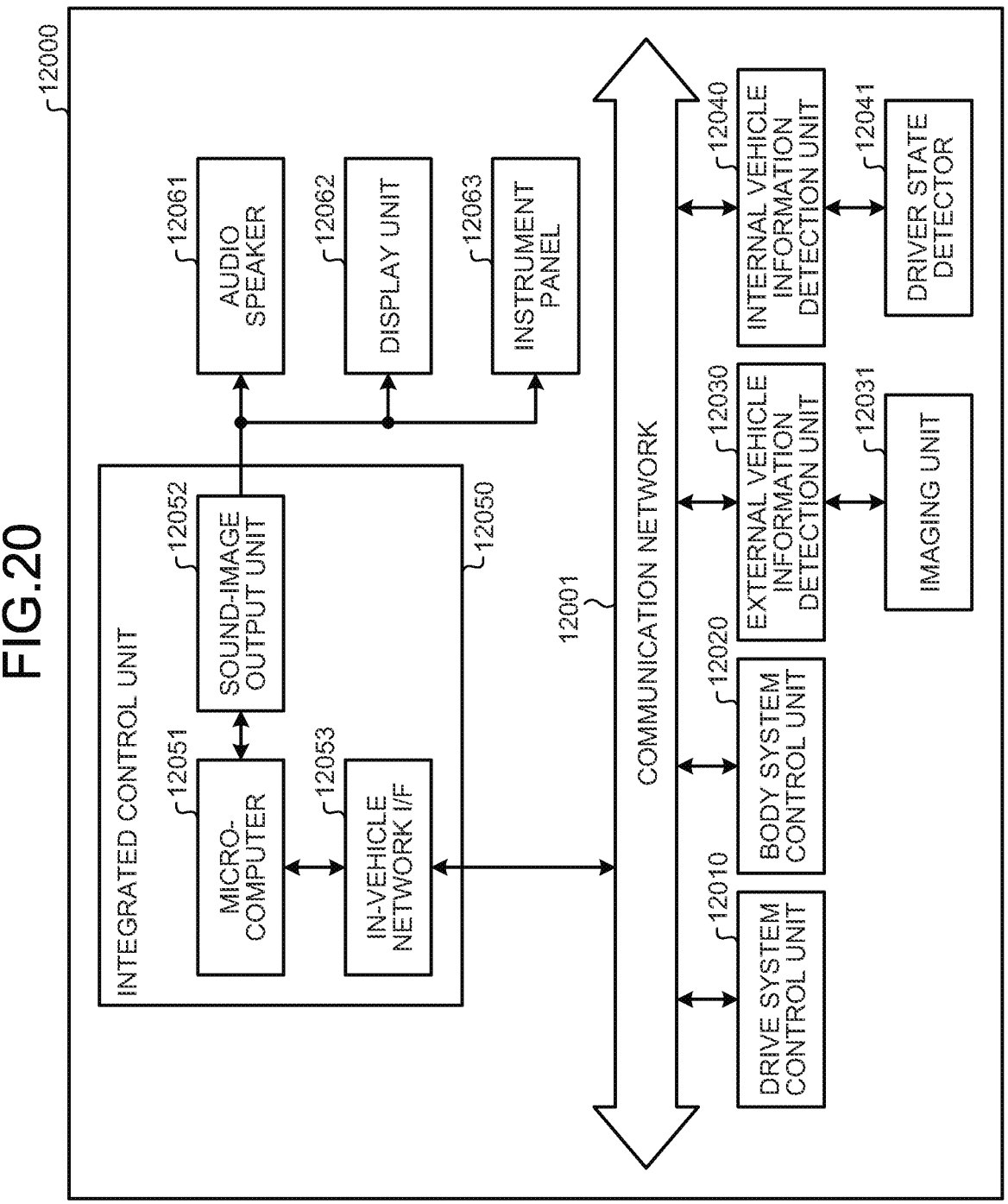
FIG. 20 is a block diagram illustrating a schematic configuration example of a vehicle control system, which is an example of a moving object control system to which a technology according to the present disclosure can be applied.

FIG. 20 is a block diagram illustrating a schematic configuration example of a vehicle control system, which is an example of a moving object control system to which the technology according to the present disclosure can be applied.

A vehicle control system 12000 includes a plurality of electronic control units connected via a communication network 12001. In the example illustrated in FIG. 20, the vehicle control system 12000 includes a drive system control unit 12010, a body system control unit 12020, an external vehicle information detection unit 12030, an internal vehicle information detection unit 12040, and an integrated control unit 12050. In addition, as a functional configuration of the integrated control unit 12050, a microcomputer 12051, a sound-image output unit 12052, and an in-vehicle network interface (I/F) 12053 are illustrated.

The drive system control unit 12010 controls operations of devices related to a drive system of a vehicle according to various programs. For example, the drive system control unit 12010 functions as a control device of a driving force generation device, such as an internal combustion engine and a driving motor, configured to generate a driving force of the vehicle, a driving force transmitting mechanism configured to transmit the driving force to wheels, a steering mechanism that adjusts a steering angle of the vehicle, a braking device that generates a braking force of the vehicle, and the like.

The body system control unit 12020 controls operations of various devices mounted on a vehicle body according to various programs. For example, the body system control unit 12020 functions as a control device of a keyless entry system, a smart key system, a power window device, or various lamps such as a head lamp, a back lamp, a brake lamp, a turn signal, and a fog lamp. In this case, the body system control unit 12020 can receive input of radio waves transmitted from a portable device substituted for a key or signals of various switches. The body system control unit 12020 receives input of these radio waves or signals to control a door lock device, the power window device, the lamps, or the like of the vehicle.

The external vehicle information detection unit 12030 detects information regarding the outside of the vehicle on which the vehicle control system 12000 is mounted. For example, an imaging unit 12031 is connected to the external vehicle information detection unit 12030. The external vehicle information detection unit 12030 causes the imaging unit 12031 to capture an image of the outside of the vehicle and receives the captured image. The external vehicle information detection unit 12030 may perform object detection processing or distance detection processing of a person, a car, an obstacle, a sign, a character, or the like on a road surface based on the received image. The external vehicle information detection unit 12030 performs image processing on the received image, and performs object detection processing or distance detection processing based on a result of the image processing.

The imaging unit 12031 is an optical sensor that receives light and outputs an electrical signal according to the amount of the received light. The imaging unit 12031 can output the electrical signal as an image and also as ranging information. In addition, the light received by the imaging unit 12031 may be visible light or invisible light such as infrared light.

The internal vehicle information detection unit 12040 detects internal vehicle information. The internal vehicle information detection unit 12040 is connected with a driver condition detection unit 12041 that detects a condition of a driver, for example. The driver condition detection unit 12041 includes a camera that images the driver, for example, and the internal vehicle information detection unit 12040 may calculate a degree of fatigue or degree of concentration of the driver or may determine whether the driver is dozing off based on detection information input from the driver condition detection unit 12041.

The microcomputer 12051 can calculate a control target value of the driving force generation device, the steering mechanism, or the braking device based on the information regarding the inside or outside of the vehicle acquired by the external vehicle information detection unit 12030 or the internal vehicle information detection unit 12040, and output a control command to the drive system control unit 12010. For example, the microcomputer 12051 can perform cooperative control for the purpose of implementing a function of an advanced driver assistance system (ADAS) including collision avoidance or impact mitigation for the vehicle, travel following a vehicle ahead based on an inter-vehicle distance, constant speed travel, a vehicle collision warning, or a warning for the vehicle deviating a lane.

In addition, the microcomputer 12051 can perform cooperative control for the purpose of automated driving or the like with which the vehicle travels autonomously without depending on the driver's operation by controlling the driving force generation device, the steering mechanism, the braking device, or the like based on information regarding the surroundings of the vehicle acquired by the external vehicle information detection unit 12030 or the internal vehicle information detection unit 12040.

In addition, the microcomputer 12051 can output a control command to the body system control unit 12020 based on the information regarding the outside of the vehicle acquired by the external vehicle information detection unit 12030. For example, the microcomputer 12051 can perform cooperative control for the purpose of anti-glare such as switching from a high beam to a low beam by controlling a head lamp depending on a position of a vehicle ahead or an oncoming vehicle detected by the external vehicle information detection unit 12030.

The sound-image output unit 12052 transmits an output signal of at least one of a sound or an image to an output device that can visually or aurally provide notification of information to a passenger of the vehicle or the outside of the vehicle. In the example of FIG. 20, an audio speaker 12061, a display unit 12062, and an instrument panel 12063 are exemplified as the output device. The display unit 12062 may include at least one of an on-board display and a head-up display, for example.

Figure 21:
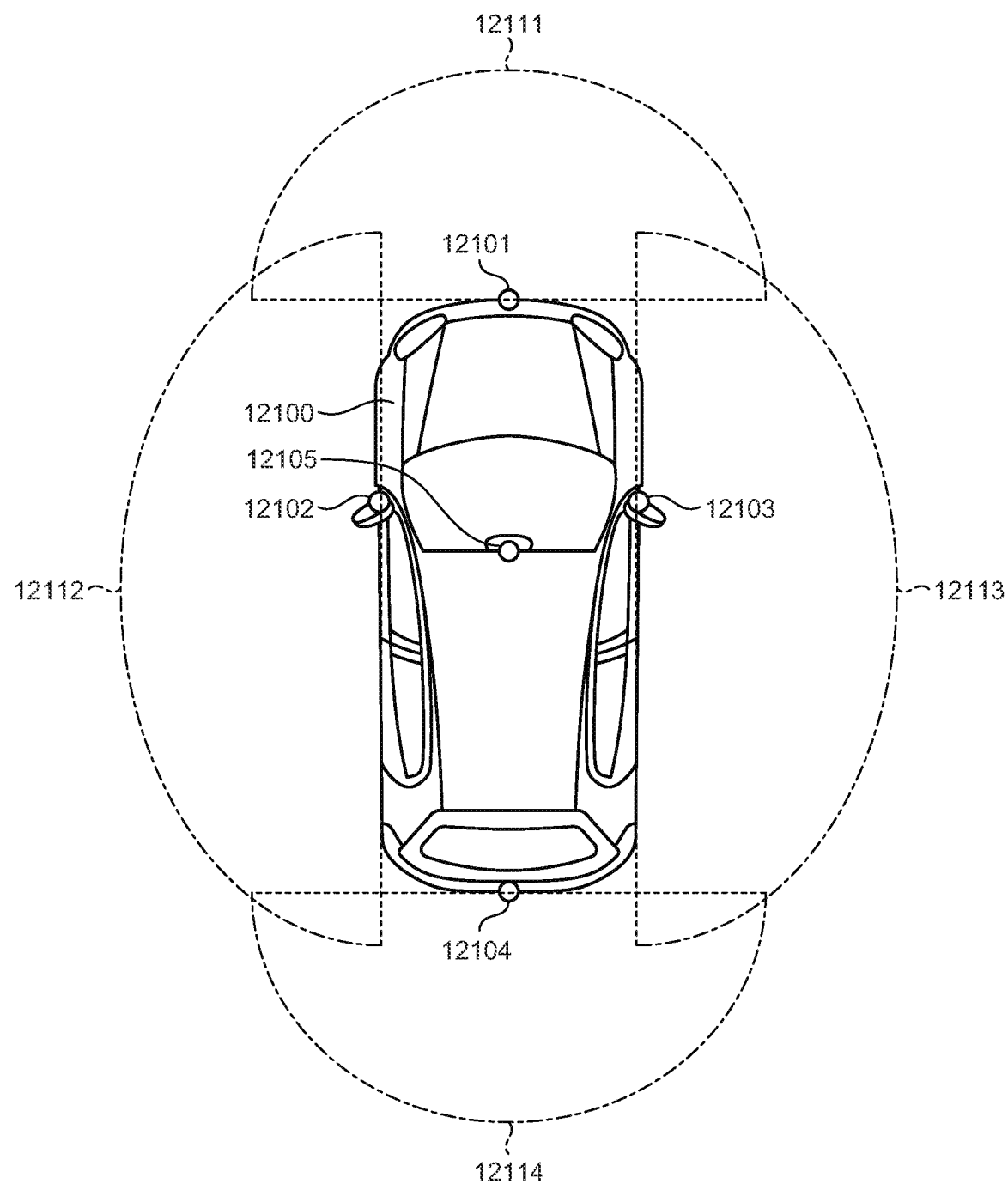
FIG. 21 is a view illustrating an example of an installation position of an imaging unit.

FIG. 21 is a view illustrating an example of an installation position of the imaging unit 12031. In FIG. 21, a vehicle 12100 has an imaging units 12101, 12102, 12103, 12104, and 12105 as the imaging unit 12031.

The imaging units 12101, 12102, 12103, 12104, and 12105 are installed at positions such as a front nose, side mirrors, a rear bumper, a back door, and an upper part of a windshield in a passenger compartment of the vehicle 12100, for example. The imaging unit 12101 installed at the front nose and the imaging unit 12105 installed in the upper part of the windshield in the passenger compartment mainly acquire an image of an area in front of the vehicle 12100. The imaging units 12102 and 12103 installed on the side mirrors mainly acquire images of the sides of the vehicle 12100. The imaging unit 12104 installed on the rear bumper or the back door mainly acquires an image of an area behind the vehicle 12100. The image of the area in front of the vehicle acquired by the imaging units 12101 and 12105 is mainly used to detect a vehicle ahead or a pedestrian, an obstacle, a traffic light, a traffic sign, a lane, or the like.

Note that FIG. 21 illustrates an example of capturing ranges of the imaging units 12101 to 12104. An imaging range 12111 indicates an imaging range of the imaging unit 12101 provided on the front nose, imaging ranges 12112 and 12113 indicate imaging ranges of the imaging units 12102 and 12103 provided on the side mirrors, respectively, and an imaging range 12114 indicates an imaging range of the imaging unit 12104 provided on the rear bumper or the back door. For example, a bird's-eye view image of the vehicle 12100 viewed from above can be obtained by superimposing image data captured by the imaging units 12101 to 12104.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 obtains a distance to each three-dimensional object within the imaging ranges 12111 to 12114 and a temporal change in the distance (relative speed with respect to the vehicle 12100) based on the distance information obtained from the imaging units 12101 to 12104, and thus, can particularly extract, as a vehicle ahead, a three-dimensional object closest on a path of travel of the vehicle 12100 and traveling at a predetermined speed (for example, 0 km/h or faster) in substantially the same direction as that of the vehicle 12100. Further, the microcomputer 12051 can set an inter-vehicle distance to be secured in advance behind the vehicle ahead, and perform automatic brake control (including follow-up stop control), automatic acceleration control (including follow-up start control), and the like. In this manner, it is possible to perform the cooperative control for the purpose of automated driving or the like for autonomous traveling without depending on the driver's operation.

For example, the microcomputer 12051 classifies three-dimensional object data relating to a three-dimensional object into a two-wheeled vehicle, a standard sized vehicle, a large sized vehicle, a pedestrian, and other three-dimensional objects such as a utility pole, and extracts the data for use in automatic avoidance of an obstacle on the basis of the distance information obtained from the imaging units 12101 to 12104. For example, the microcomputer 12051 distinguishes identifies an obstacle in the vicinity of the vehicle 12100 as an obstacle that can be visually recognized by the driver of the vehicle 12100 or an obstacle that is difficult to be visually recognized by the driver. Then, the microcomputer 12051 determines a risk of collision indicating the degree of risk of collision with each obstacle, and can perform driver assistance to avoid collision in a situation where there is a possibility of collision with the risk of collision equal to or higher than a set value by outputting an alarm to the driver via the audio speaker 12061 and/or the display unit 12062 or performing forced deceleration or evasive steering via the drive system control unit 12010.

At least one of the imaging units 12101 to 12104 may be an infrared camera that detects infrared light. For example, the microcomputer 12051 can recognize a pedestrian by determining whether the pedestrian is present in images captured by the imaging units 12101 to 12104. Such pedestrian recognition is performed by a procedure of extracting feature points in the images captured by the imaging units 12101 to 12104, which are infrared cameras, for example, and a procedure of performing pattern matching on a series of feature points indicating an outline of an object and determining whether the object corresponds to the pedestrian. When the microcomputer 12051 determines that the pedestrian is present in the images captured by the imaging units 12101 to 12104 and recognizes the pedestrian, the sound-image output unit 12052 controls the display unit 12062 such that a rectangular contour for emphasis is superimposed and displayed on the recognized pedestrian. In addition, the sound-image output unit 12052 may also control the display unit 12062 to display an icon or the like indicating the pedestrian at a desired position.

An example of the vehicle control system to which the technology according to the present disclosure can be applied has been described above. The technology according to the present disclosure can be applied to, for example, the imaging unit 12031 and the like among the configurations described above. Specifically, the distance measurement device 1 according to the first embodiment of the present disclosure described above can be applied to the imaging unit 12031. When the technology according to the present disclosure is applied to the imaging unit 12031, it is possible to provide the distance measurement device 1 that measures a distance from a traveling vehicle with a smaller-scale configuration.

Note that the effects described in the present specification are merely examples and are not restrictive of the disclosure herein, and other effects not described herein also can be achieved.

Note that the present technology can also have the following configurations.

(1) A light reception device comprising:
a light receiving unit including a plurality of light receiving elements arranged in a matrix array; and
a plurality of read lines that transmits each of signals read from the plurality of light receiving elements,
wherein the each of plurality of read lines is
connected to two or more light receiving elements among the plurality of light receiving elements.

(2) The light reception device according to the above (1), further comprising:
a plurality of row control signal lines that transmits a row control signal for controlling the plurality of light receiving elements for each row of the array; and
a plurality of column control signal lines that transmits a column control signal for controlling the plurality of light receiving elements for each column of the array,
wherein each of the plurality of row control signal lines transmits the row control signal for each of the plurality of rows of the array, and
each of the plurality of column control signal lines transmits the column control signal to each of the plurality of columns of the array.

(3) The light reception device according to the above (2), wherein
at least one of the column control signal and the row control signal includes a power supply control signal for controlling supply of power to the light receiving element.

(4) The light reception device according to any one of the above (1) to (3), further comprising
a plurality of group control signal lines that transmits a group control signal for controlling the plurality of light receiving elements for each group including two or more light receiving elements,
wherein each of the plurality of group control signal lines
transmits the group control signal for each of two or more of the groups.

(5) The light reception device according to the above (1), wherein
each of the plurality of read lines is
connected with the two or more light receiving elements via an OR circuit.

(6) The light reception device according to the above (5), wherein
the OR circuit includes a first OR circuit and a second OR circuit,
a first light receiving element among the two or more light receiving elements is connected to a first input end of the first OR circuit,
an output end of the second OR circuit among the two or more light receiving elements is connected to a second input end of the first OR circuit, and
a second light receiving element among the two or more light receiving elements is connected to a first input end of the second OR circuit.

(7) The light reception device according to any one of the above (1) to (6), wherein
the light receiving unit includes
the plurality of read lines provided along a predetermined direction, respectively, in rows or columns of the array, and
the two or more light receiving elements are
connected to the read lines every (v−1) rows or columns (v is an integer of two or more) along the predetermined direction of the array.

(8) The light reception device according to any one of the above (1) to (7), further comprising
a designation unit that designates a light receiving element to perform reading from the plurality of light receiving elements,
wherein the designation unit
designates the reading of the two or more light receiving elements at different timings.

(9) The light reception device according to the above (8), wherein
the designation unit
designates the reading of v light receiving elements, consecutively arranged along a direction in which the two or more light receiving elements are connected, among the plurality of light receiving elements at an identical timing.

(10) The light reception device according to the above (8) or (9), wherein
the designation unit
designates the reading for a plurality of light receiving elements included in a rectangular area in the array among the plurality of light receiving elements included in the light receiving unit.

(11) The light reception device according to any one of the above (8) to (10), wherein
the light receiving unit
receives light including reflection light generated as light emitted from a light source is reflected by an object, and
the designation unit
designates a light receiving element to perform reading of the signal among the plurality of light receiving elements according to an area acquired in advance where the reflection light is estimated to be emitted to the light receiving unit.

(12) The light reception device according to any one of the above (8) to (11), further comprising
a storage unit that stores a parameter for designating a light receiving element to perform the reading among the plurality of light receiving elements,
wherein the designation unit
designates the light receiving element to perform the reading based on the parameter stored in the storage unit.

(13) The light reception device according to the above (12), wherein
the storage unit
stores the parameter according to an external input.

(14) A distance measurement device comprising:
a light receiving unit including a plurality of light receiving elements arranged in a matrix array;
a plurality of read lines that transmits each of signals read from the plurality of light receiving elements;
a time measurement unit that measures a time from a light emission timing when a light source emits light to a light reception timing when the plurality of light receiving elements receive the light and acquires a measured value;
a generation unit that generates a histogram of the measured value; and a calculation unit that calculates a distance to a measured object based on the histogram,
wherein each of the plurality of read lines is connected with two or more light receiving elements among the plurality of light receiving elements.

(15) The distance measurement device according to the above (14), further including:
a plurality of row control signal lines that transmits a row control signal for controlling the plurality of light receiving elements for each row of the array; and
a plurality of column control signal lines that transmits a column control signal for controlling the plurality of light receiving elements for each column of the array,
in which each of the plurality of row control signal lines transmits the row control signal for each of the plurality of rows of the array, and
each of the plurality of column control signal lines transmits the column control signal to each of the plurality of columns of the array.

(16) The distance measurement device according to the above (15), in which
at least one of the column control signal and the row control signal includes a power supply control signal for controlling supply of power to the light receiving element.

(17) The distance measurement device according to any one of the above (14) to (16), further including
a plurality of group control signal lines that transmits a group control signal for controlling the plurality of light receiving elements for each group including two or more light receiving elements,
in which each of the plurality of group control signal lines
transmits the group control signal for each of two or more of the groups.

(18) The distance measurement device according to any one of the above (14) to (17), in which
each of the plurality of read lines is
connected with the two or more light receiving elements via an OR circuit.

(19) The distance measurement device according to the above (18), in which
the OR circuit includes a first OR circuit and a second OR circuit,
a first light receiving element among the two or more light receiving elements is connected to a first input end of the first OR circuit,
an output end of the second OR circuit among the two or more light receiving elements is connected to a second input end of the first OR circuit, and
a second light receiving element among the two or more light receiving elements is connected to a first input end of the second OR circuit.

(20) The distance measurement device according to any one of the above (14) to (19), in which
the light receiving unit includes
the plurality of read lines provided along a predetermined direction, respectively, in rows or columns of the array, and
the two or more light receiving elements are connected to the read lines every (v−1) rows or columns (v is an integer of two or more) along the predetermined direction of the array.

(21) The distance measurement device according to the above (14), further including
a designation unit that designates a light receiving element to perform reading from the plurality of light receiving elements,
in which the designation unit
designates the reading of the two or more light receiving elements at different timings.

(22) The distance measurement device according to the above (21), in which
the designation unit
designates the reading of v light receiving elements, consecutively arranged along a direction in which the two or more light receiving elements are connected, among the plurality of light receiving elements at an identical timing.

(23) The distance measurement device according to the above (21) or (22), in which
the designation unit
designates the reading for a plurality of light receiving elements included in a rectangular area in the array among the plurality of light receiving elements included in the light receiving unit.

(24) The distance measurement device according to any one of the above (21) to (23), in which
the light receiving unit
receives light including reflection light generated as light emitted from a light source is reflected by an object, and
the designation unit
designates a light receiving element to perform reading of the signal among the plurality of light receiving elements according to an area acquired in advance where the reflection light is presumed to be emitted to the light receiving unit.

(25) The distance measurement device according to any one of the above (21) to (24), further including
a storage unit that stores a parameter for designating a light receiving element to perform the reading among the plurality of light receiving elements,
in which the designation unit
designates the light receiving element to perform the reading based on the parameter stored in the storage unit.

(26) The distance measurement device according to the above (25), in which
the storage unit
stores the parameter according to an external input.

REFERENCE SIGNS LIST

1 DISTANCE MEASUREMENT DEVICE
2 LIGHT SOURCE UNIT
3 STORAGE UNIT
4 CONTROL UNIT
6 ELECTRONIC DEVICE
10, $10_{11}$, $10_{13}$, $10_{1v}$, $10_{21}$, $10_{22}$, $10_{2v}$, $10_{31}$, $10_{3v}$, $10_{obj}$ PIXEL CIRCUIT
11 ELEMENT
$41_{11}$, $41_{1v}$, $41_{21}$, $41_{2v}$, $41_{31}$, $41_{3v}$ OR CIRCUIT
50 TRAJECTORY
51a, $51b_1$, $51b_2$, $51b_3$, $51b_4$, $51b_5$, $51b_6$, $51b_7$, $51b_8$, 61, $61_1$, $61_2$, $61_3$, $61_4$ READ AREA
55a, 55b OFFSET
56a, 56b PEAK
60 EFFECTIVE AREA
100 PIXEL ARRAY UNIT 102 PIXEL CONTROL UNIT
102a HORIZONTAL CONTROL UNIT
102b VERTICAL CONTROL UNIT

The invention claimed is:

1. A light reception device, comprising:
a light receiving unit that includes a plurality of light receiving elements in a matrix array; and
a plurality of read lines configured to:
read a plurality of signals from each of the plurality of light receiving elements; and
transmit each of the read plurality of signals, wherein each of the plurality of read lines is connected to at least two light receiving elements of the plurality of light receiving elements through an OR circuit, the OR circuit includes a first OR circuit and a second OR circuit,
a first light receiving element of the at least two light receiving elements is connected to a first input end of the first OR circuit,
an output end of the second OR circuit, of one of the at least two light receiving elements, is connected to a second input end of the first OR circuit, and
a second light receiving element of the at least two light receiving elements is connected to an input end of the second OR circuit.

2. The light reception device according to claim 1, further comprising a plurality of row control signal lines and a plurality of column control signal lines, wherein
the matrix array includes a plurality of rows and a plurality of columns,
each of the plurality of row control signal lines is configured to:
transmit a row control signal to each of the plurality of rows of the matrix array; and
control the plurality of light receiving elements in each row of the plurality of rows, and
each of the plurality of column control signal lines is configured to:
transmit a column control signal to each of the plurality of columns of the matrix array; and
control the plurality of light receiving elements in each column of the plurality of columns.

3. The light reception device according to claim 2, wherein at least one of the column control signal or the row control signal includes a power supply control signal to control supply of power to the plurality of light receiving elements.

4. The light reception device according to claim 1, further comprises a plurality of group control signal lines configured to:
transmit a group control signal; and
control the plurality of light receiving elements based on the group control signal.

5. The light reception device according to claim 1, wherein
the light receiving unit further includes the plurality of read lines in a specific direction of the matrix array,
the matrix array includes a plurality of rows and a plurality of columns,
the at least two light receiving elements of the plurality of light receiving elements are connected to each of the plurality of read lines,
the plurality of read lines is at one of (v−1) of the plurality of rows or (v−1) of the plurality of columns, and
v is an integer greater than or equal to two.

6. The light reception device according to claim 1, further comprising a designation unit configured to:
designate a specific light receiving element of the plurality of light receiving elements; and
designate each of the at least two light receiving elements of the plurality of light receiving elements at different timings, wherein the specific light receiving element is configured to read the plurality of light receiving elements.

7. The light reception device according to claim 6, wherein
the designation unit is further configured to designate a set of light receiving elements of the plurality of light receiving elements,
the set of light receiving elements is configured to read the plurality of light receiving elements at a specific timing,
each of the set of light receiving elements is in a specific direction, and
the specific direction is associated with the at least two light receiving elements of the plurality of light receiving elements that are connected to each of the plurality of read lines.

8. The light reception device according to claim 6, wherein
the designation unit is further configured to designate a set of light receiving elements of the plurality of light receiving elements,
the set of light receiving elements is configured to read from the plurality of light receiving elements, and
the set of light receiving elements is included in a rectangular area in the matrix array.

9. The light reception device according to claim 6, wherein
the light receiving unit is further configured to receive light that includes reflection light,
the reflection light corresponds to light emitted from a light source,
the reflection light is reflected by an object,
the designation unit is further configured to designate the specific light receiving element of the plurality of light receiving elements,
the specific light receiving element is further configured to read the plurality of signals based on a specific area,
the specific area is associated with the reflection light, and
the reflection light is emitted to the light receiving unit.

10. The light reception device according to claim 6, further comprising a storage unit configured to store a parameter associated with the designation of the specific light receiving element, wherein the specific light receiving element is configured to read the plurality of light receiving elements based on the stored parameter.

11. The light reception device according to claim 10, wherein the storage unit is further configured to store the parameter based on an external input.

12. A distance measurement device, comprising:
a light receiving unit configured to receive specific light; wherein the light receiving unit includes a plurality of light receiving elements in a matrix array;
a plurality of read lines configured to:
read a plurality of signals from each of the plurality of light receiving elements; and
transmit each of the read plurality of signals, wherein each of the plurality of read lines is connected to at least two light receiving elements of the plurality of light receiving elements through an OR circuit the OR circuit includes a first OR circuit and a second OR circuit, a first light receiving element of the at least two light receiving elements is connected to a first input end of the first OR circuit, an output end of the second OR circuit, of one of the at least two light receiving elements, is connected to a second input end of the first OR circuit, and a second light receiving element of the at least two light receiving elements is connected to an input end of the second OR circuit;

a time measurement unit configured to measure a time period from a time of light emission to a time of light reception, wherein the time of light emission corresponds to a time associated with emission of light by a light source, the time of light reception corresponds to a time associated with the reception of the specific light, and the plurality of light receiving elements is further configured to acquire the measured time period;

a generation unit configured generate a histogram based on the measured time period; and a calculation unit configured to determine a distance to a measured object based on the histogram.

* * * * *